(12) United States Patent
Malik et al.

(10) Patent No.: US 12,196,486 B2
(45) Date of Patent: Jan. 14, 2025

(54) AIR SEPARATION APPARATUS, ADSORBER, AND METHOD

(71) Applicant: Air Products and Chemicals, Inc., Allentown, PA (US)

(72) Inventors: Nasim Ul Hassan Malik, London (GB); Gowri Krishnamurthy, Sellersville, PA (US); Dingjun Wu, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 431 days.

(21) Appl. No.: 17/381,404

(22) Filed: Jul. 21, 2021

(65) Prior Publication Data
US 2023/0027070 A1 Jan. 26, 2023

(51) Int. Cl.
F25J 3/04 (2006.01)
F25J 3/08 (2006.01)

(52) U.S. Cl.
CPC ....... F25J 3/04169 (2013.01); F25J 3/04157 (2013.01); F25J 3/04163 (2013.01); F25J 3/04775 (2013.01); F25J 3/04824 (2013.01); F25J 3/08 (2013.01); F25J 2205/60 (2013.01); F25J 2210/40 (2013.01); F25J 2220/40 (2013.01)

(58) Field of Classification Search
CPC .. F25J 3/04775; F25J 3/04151; F25J 3/04157; F25J 3/04163; F25J 3/04169; F25J 3/04175; F25J 3/04181; B01D 53/0431; B01D 53/0454; B01D 53/56; B01D 53/565; B01D 53/81; B01D 2311/22; B01D 2315/18; B01D 2325/28; B01D 35/12
See application file for complete search history.

(56) References Cited

U.S. PATENT DOCUMENTS

| 4,351,654 A * | 9/1982 | Krebs | F28G 9/00 62/641 |
|---|---|---|---|
| 5,425,240 A | 6/1995 | Jain et al. | |
| 5,919,286 A * | 7/1999 | Golden | F25J 3/04169 95/122 |
| 6,106,593 A | 8/2000 | Golden et al. | |
| 6,402,809 B1 | 11/2002 | Monereau et al. | |

(Continued)

FOREIGN PATENT DOCUMENTS

| EP | 0453202 B1 | 6/2002 |
| FR | 3069916 A1 | 2/2019 |

Primary Examiner — John F Pettitt, III
(74) Attorney, Agent, or Firm — Matthew R. Weaver

(57) ABSTRACT

A method of purifying air via a pre-purification unit (PPU) of an air separation unit (ASU) system having a pre-PPU chiller that is upstream of the PPU to cool compressed air before the compressed air is fed to the PPU can include passing air through an adsorber of the PPU to pass the air through a bed of adsorbent material within a vessel of the adsorber. In response to the pre-PPU chiller being determined to have an issue resulting in the pre-PPU chiller being tripped or requiring the pre-PPU chiller to be taken off-line, continuing to operate the ASU system at a full capacity even though nitrous oxide (N2O) within the air output from the PPU exceeds a first pre-selected threshold and is below a second pre-selected threshold associated with carbon dioxide (CO2) breakthrough. An ASU and a PPU can be designed to implement an embodiment of the method.

9 Claims, 9 Drawing Sheets

Passing air through at least one adsorber 200 of the PPU 107 to pass the air through a bed 221 of adsorbent material within a vessel 203 of the adsorber 200.

↓

In response to the cooler 104 being determined to have an issue resulting in the cooler 104 being tripped or requiring the cooler 104 to be taken off-line, the ASU system 1 can continue to operate at a full capacity even though nitrous oxide within the air output from the PPU 107 exceeds a first pre-selected threshold level and the cooler 104 is off-line or tripped.

↓

Taking a remedial action to address excess N2O within the air being output from the PPU 107 after the cooler 104 is back on-line for the ASU system 1 and the air output from the PPU 107 no longer has N2O that exceeds the first pre-selected threshold level. The remedial action that can be taken can include adjusting a defrost interval for the ASU system to account for a duration of time at which the ASU system 1 operated with the air output from the PPU 107 having N2O that exceeded the first pre-selected threshold level. The adjusting of the defrost interval can include decreasing an amount of time until a defrosting of the ASU system 1 is scheduled to occur.

(56) References Cited

U.S. PATENT DOCUMENTS

| | | | |
|---|---|---|---|
| 7,931,736 B2* | 4/2011 | Hidano | B01J 20/186 95/902 |
| 2003/0029314 A1* | 2/2003 | Nakamura | B01D 53/0423 95/117 |
| 2006/0162556 A1* | 7/2006 | Ackley | B01J 20/18 95/96 |
| 2014/0338425 A1* | 11/2014 | Kalbassi | F25J 3/04775 73/31.07 |
| 2017/0173515 A1* | 6/2017 | Gesbert | B01D 53/0462 |
| 2022/0016565 A1* | 1/2022 | Krishnamurthy | B01D 53/0431 |
| 2022/0099367 A1* | 3/2022 | Krishnamurthy | F25J 3/04278 |
| 2022/0178609 A1* | 6/2022 | Horne | F25J 3/065 |

* cited by examiner

Passing air through at least one adsorber 200 of the PPU 107 to pass the air through a bed 221 of adsorbent material within a vessel 203 of the adsorber 200.

In response to the cooler 104 being determined to have an issue resulting in the cooler 104 being tripped or requiring the cooler 104 to be taken off-line, the ASU system 1 can continue to operate at a full capacity even though nitrous oxide within the air output from the PPU 107 exceeds a first pre-selected threshold level and the cooler 104 is off-line or tripped.

Taking a remedial action to address excess $N_2O$ within the air being output from the PPU 107 after the cooler 104 is back on-line for the ASU system 1 and the air output from the PPU 107 no longer has $N_2O$ that exceeds the first pre-selected threshold level. The remedial action that can be taken can include adjusting a defrost interval for the ASU system to account for a duration of time at which the ASU system 1 operated with the air output from the PPU 107 having $N_2O$ that exceeded the first pre-selected threshold level. The adjusting of the defrost interval can include decreasing an amount of time until a defrosting of the ASU system 1 is scheduled to occur.

FIG. 7

AIR SEPARATION APPARATUS, ADSORBER, AND METHOD

FIELD OF THE INVENTION

The present innovation relates to air separation systems, pre-purification unit arrangements utilizable in such systems, adsorbers for purification of air in air separation systems, and methods of making and using the same.

BACKGROUND OF THE INVENTION

Thermal Swing Adsorption (TSA) is frequently used alongside technology like Pressure Swing Adsorption (PSA) as pre-purification to air cryogenic distillation processes. TSA's function is to remove components with high freezing point such as ambient moisture (e.g. water vapor, H2O) and carbon dioxide (CO2) which would otherwise freeze out in downstream processing, causing operability issue like blockage. Nitrous oxide (N2O), hydrocarbons (e.g. methane, CH4, etc.), and other impurities can also be removed via front-end purification to avoid these impurities from accumulating in downstream processes.

Purification units often utilize adsorbers. The adsorber typically come in four different common configurations: vertical, vertical cross flow, horizontal and radial. Examples of these types of adsorbers, TSA systems, and PSA systems can be appreciated from U.S. Pat. Nos. 4,472,178, 4,541, 851, 4,784,672, 5,137,548, 5,232,474, 5,425,240, 5,759,242, 5,846,295, 5,917,136, 6,086,659, 6,106,593, 6,152,991, 6,506,236, 6,599,347, 6,866,075, 7,022,159, 7,285,154, 7,413,595, 8,206,669, 8,262,783, 8,268,044, 8,404,024, 8,518,356, 8,734,571, 8,814,985, 9,108,145, 9,199,190, 9,631,864, and 9,731,241, U.S. Pat. App. Pub. Nos. 2011/0206581, 2011/0219950 and 2019/0291078 and Canadian Patent Publication No. 2,357,276 A.

As disclosed in U.S. Pat. No. 6,106,593, it is known that oxides of nitrogen should be removed from feed air for air separation. A minor air component is nitrous oxide N2O, which is present in ambient air at about 0.3 ppm. As taught in U.S. Pat. No. 6,106,593, N2O is recognized as having similar physical properties to carbon dioxide and is therefore known to present a potential operational problem because of solids formation in the air separation column and heat exchangers of the cryogenic distillation system used to separate the air into one or more products (e.g. oxygen, nitrogen, etc.).

U.S. Pat. No. 6,106,593 also discloses that N2O is known to enhance combustion of organic materials and is known to be shock sensitive. U.S. Pat. No. 6,106,593 discloses that N2O is also considered to present a safety hazard for the operation of cryogenic distillation systems.

SUMMARY

We determined that air separation unit (ASU) systems often have to account for known operational problems associated with uses of chillers to cool compressed air before that flow of air is fed to a pre-purification unit (PPU). The cooling of the air can be important in conventional ASU systems to help ensure that there is not a breakthrough of nitrous oxide and carbon dioxide that is above a very low pre-selected threshold in the air flow output from the PPU. For example, mechanical chillers often experience equipment failures a number of times per year. For instance, a mechanical chiller's compressor may experience a failure (e.g. break, stop working, etc.) about 1-2 times per year of operation (and sometimes more often). Other types of expected failures can include heat exchanger leaks or blockages, pump failures for absorption chillers, level sensor failures, actuator failures, control system errors or failures, valve failures or some other type of mechanical failure. As a result of this known operational problem with chillers, increased capital costs are often incurred to account for such issues by providing redundant chillers as backup chillers. Alternatively, the ASU system can be designed with a significantly larger PPU that can be more costly to build and can incur significantly more operational costs to account for the non-use of a chiller and the higher input operational temperatures of the air flow to be fed to the PPU. Alternatively, the ASU system can be designed to turndown (operate at lower than design capacity) during chiller failure and operate with back-up liquid products in storage tanks, which have a significant capital cost implication. These arrangements have been conventionally developed in the art to help ensure that the ASU system 1 does not operate while CO2 and N2O breakthrough from the PPU above their very low pre-specified process ranges to avoid downstream processing issues that can affect the safety of the system.

We have determined that the goals of this safety precaution can be met while also permitting an improved use of chillers in ASU systems to provide improved operational efficiency while also maintaining the safety of continued operation of the ASU system. We have determined that permitting N2O to pass through a pre-purification unit (PPU) of an ASU system at elevated levels for a relatively short, pre-selected duration of time (e.g. no more than 14 days, no more than 7 days, or no more than 2 days, etc.) can be safely permitted to account for chiller failures that may be addressed and resolved within the pre-selected duration of time while also providing significant advantages that can result in reduced costs and improved profitability, while maintaining safe operation. For example, we determined that permitting N2O at elevated levels that exceed a first threshold level for a relatively short duration of time while still being under a second threshold level associated with a CO2 breakthrough can be permitted to pass beyond a PPU and does not pose an immediate safety concern or other immediate operational concern. In contrast, CO2 breakthrough would pose such an issue.

By permitting the ASU system to operate at full capacity during maintenance of a pre-PPU chiller or other trip of the pre-PPU chiller, the ASU can continue to function at greater overall profit and efficiency than if the ASU was shut down or operated at a lower capacity to account for the pre-PPU chiller's operational status. We determined that permitting the N2O to breakthrough the PPU at levels that exceed a first pre-selected operational threshold while still being below a second pre-selected threshold associated with a CO2 breakthrough can prevent excessive N2O accumulation in the ASU system that is not problematic in a relatively short-term duration that may be needed to address a chiller trip condition (e.g. a compressor failure, a pump failure etc., which may take 1-14 days to address, no more than 7 days to address, or no more than 2 days to address, for example). Permitting N2O breakthrough beyond the PPU within such a conditional constraint can avoid a severe issue associated with CO2 breakthrough and can be mitigated by an adjustment of the defrost interval for the ASU system to make this interval slightly shorter (e.g. 1-4 months shorter, 0.5-5 months shorter, 0.5-2 months shorter, etc.) to account for the duration of operation at increased N2O levels.

Because N2O elevated levels do not pose an immediate issue, we determined that the operational tradeoffs permit N2O to break through a PPU while CO2 remains tightly controlled. Further, the elevated N2O condition can be further mitigated at other operational times of the ASU system that can be more advantageous to an operator of the ASU system without significantly offsetting the operational efficiency and cost savings provided by permitting limited N2O breakthrough operations of the system.

An additional benefit that embodiments of the PPU, ASU system and method can provide related to a decrease in capital costs. For example, embodiments can allows for flexibility in whether the chiller is operational or not while allowing a PPU vessel size to be kept to a smaller size, which impacts capital cost. Conventionally, as the PPU feed temperature increases (such as, when chiller trips), the typical expectation is that the PPU size must be increased to account for such an operational situation as more molecular sieve is required to ensure removal of CO2 and N2O. It is an unexpected benefit of embodiments of our ASU system and method that the operational flexibility and continuity that can be provided can also be provided at lower capital cost and use of a lower quantity of molecular sieve adsorbent material.

For example, an ASU system can undergo a corrective action when the system is not operating with the elevated N2O levels (e.g. at turndown and/or winter ambient operational conditions) to help mitigate N2O accumulation that can detrimentally affect an operational unit of the system. For example, the defrost interval for the ASU system can be adjusted to account for the duration of the elevated N2O operational impact on the system. Such a defrost time interval typically occurs every few years (e.g. 3-10 years, 3-8 years, 5-8 years, 4-10 years, etc.). The slight adjustment of this interval (e.g. by 1-2 months, 0.5-1 months, 0.5-4 months, etc.) can have a negligible impact on cost and efficiency improvements provided by operations of the ASU system at elevated N2O levels that account for periodic operational issues of a chiller that is upstream of the PPU for cooling compressed feed air to be fed to the PPU for removal of undesired impurities within the air.

As one specific, non-limiting example to help illustrate the novel tradeoff we have determined to be viable for embodiments of our method, our PPU, and ASU system, an ASU system can be designed to process 3,000 tonnes of oxygen per day. In such a system, chiller trips that result in operating at excessive N2O levels for up to 8 total days of operation in which 50% of ambient N2O within the compressed air fed to the PPU is permitted to breakthrough the PPU and escape into the ASU can be permitted and result in an adjustment of the defrost interval to account for this elevated N2O operational duration for 8 days. Such an adjustment can reduce the defrost interval by about 24 days (e.g. require the defrost procedure to occur 24 days more quickly) for this particular non-limiting example. In other examples, an ASU system designed for a 3 year defrost interval or 5 year defrost interval that is operated at excessive N2O levels for up to 8 total days of operation in which 50% of ambient N2O within the compressed air fed to the PPU is permitted to breakthrough the PPU and escape into the ASU can result in the adjustment in the defrost interval reduction to be 16 days or 30 days, respectively.

It should be appreciated that this defrost interval is the period of time at which the ASU can continuously operate between defrost operations (e.g. a time period between a first defrost operation performed on the ASU and the next second defrost operation performed on the ASU. For instance, if the defrost interval is 3 years, for example, then 3 years would separate the first and second defrost intervals and there would be no other defrost operation performed within this 3 year period of time between the first and second defrost operations. As another example, if the defrost interval is 5 years, then 5 years would separate the first and second defrost operations and there would be no intermediate defrost operation performed within this 5 year defrost interval time period.

We determined that embodiments can provide a significant operational improvement and improved operational flexibility as the defrost interval can be timed by an operator to account for the operator's operational convenience and avoids unnecessary costs associated with a redundant chiller, larger PPU design, or unexpectedly taking the ASU system off-line to account for an unplanned for chiller trip. This adjustment to the defrost interval can permit the ASU system to safely operate at elevated N2O levels for one or more durations that are each within a pre-determined period of time. The ASU system can be configured to monitor for excess N2O and CO2 accumulation to provide a further enhancement to the safety of the operation of the ASU system and help facilitate an adjustment to the defrost interval is safely implemented due to the shortening of this interval that can be necessitated due to the running of the ASU at the elevated N2O levels.

We have determined that embodiments of our ASU system, PPU, and adsorbers can provide significant advantages. For example, embodiments of the adsorbers can enable reliable and uninterrupted operation of the ASU system regardless of chiller trips. Chiller trips can be conditions in which a pre-PPU chiller has experienced a failure that could require the chiller to be taken off-line (e.g. bypassed so it is no longer operated) or have to be operated at a reduced capacity.

Examples of a chiller trip can include a pump failure, a compressor failure, a heat exchanger leak (e.g. an evaporator leak, a generator leak etc.), a blockage of a chiller conduit, a valve failure, a pump failure, level sensor failure, actuator failure, control system error or failure, or other type of mechanical malfunction. Such failures can be associated with a reduced performance of the chiller that prevents the chiller from cooling the compressed air output from a compressor system to within a desired pre-selected PPU feed temperature range, which can result in the effectiveness of the PPU being detrimentally affected at being able to adsorb impurities such as N2O and/or CO2.

As another example, embodiments of the adsorbers can utilize a smaller molecular sieve layer of adsorbent material for N2O removal, which can significantly reduce the required size of an adsorber for a PPU. This can improve operational efficiency as well as reduce the overall capital cost, maintenance cost, and operational cost of a PPU utilizing such adsorbers. Embodiments of our PPU using embodiments of our adsorbers can also eliminate the need for chiller redundancy for a pre-PPU chiller of the ASU system that is positioned upstream of the PPU for cooling air to be fed to the PPU. The avoidance of a backup chiller to go on-line to function in the event the on-line chiller experience a problem or requires maintenance can greatly reduce the capital cost of a system and reduce the required footprint for such a system. In some types of facilities, this can provide a significant capital cost saving since the additional chiller and installation of the redundant chiller can be avoided. In some large ASU systems, such a cost savings may be in the range of up to $500,000 or up to a few million dollars. In some small-to-medium sized ASU systems, the cost savings may be in the range of $100,000-$400,000.

Embodiments of the PPU and adsorber can also permit an ASU system to be operated without having a special N2O removal layer, which can often require a higher temperature regeneration gas as compared to use of other adsorbent materials that have a lower adsorbent material regeneration temperature. For example, embodiments of our adsorber can avoid use of a layer of CaX adsorbent material, which can require use of a regeneration gas having a temperature of 300° C. or higher and can be up to 30% more expensive than some types of adsorbent material (e.g. NaMSX adsorbent material). Such embodiments can therefore provide a lower operational cost requiring lower temperature regeneration gas flows.

In some embodiments, each adsorber of the PPU can have a single layer of material for its bed of adsorbent material that includes a molecular sieve material (e.g. 13, NaX, NaMSX, alumina, silica gel, combinations thereof, such as physical mixture as well as composite adsorbents containing alumina and molecular sieve, etc.) that is configured to remove 95%-100% of the water or 99%-100% of the water, 95%-100% of the CO2 or 99%-100% of the CO2, and 50%-100% of the N2O or 95-100% of the N2O within the air fed to the PPU when the chiller operates normally and is configured to remove 95%-100% of the water or 99%-100% of water, 95-100% of the CO2 or 99%-100% of the CO2, and 20%-50% of the N2O within the air fed to the PPU when the chiller has tripped and is offline or operating in a reduced capacity.

In some embodiments, the adsorber can be configured so that the amount of N2O that is removed when the chiller is in a tripped condition can be 20%-50% or 10%-50% of the N2O that is within the air fed to the PPU or less than 50% of the N2O that is within the air fed to the PPU. For example, in situations where the N2O content is 0.4 ppm in the air fed to the PPU, the N2O content in the purified air output from the PPU may be in a range of 0.25 ppm to 0.2 ppm N2O, in a range that is 0.25 ppm to 0.32 ppm N2O, a range of 0.3-0.25 ppm N2O, or in a range of 0.2 ppm to 0.32 ppm N2O when the chiller operates in a tripped condition. In such embodiments, the content of the N2O within the air output from the PPU when the chiller is operating normally can be in the range of 0 ppm to 0.015 ppm, 0 ppm to 0.2 ppm, less than 0.015 ppm, or in a range of 0.03 ppm to 0.015 ppm.

As another example, in situations where the N2O content is 0.3 ppm in the air fed to the PPU, the N2O content in the purified air output from the PPU may be in a range of 0.15 ppm to 0.0675 ppm N2O range, in a range that is 0.15 to 0.3 ppm N2O, 0.15 to 0.24 ppm N2O, or in a range of 0.27-0.15 ppm N2O when the chiller operates in a tripped condition. In such embodiments, the content of the N2O within the air output from the PPU when the chiller is operating normally can be in the range of 0 ppm to 0.015 ppm, 0 ppm to 0.15 ppm, less than 0.015 ppm, or in a range of 0.03 ppm to 0.015 ppm.

Embodiments of the PPU and adsorbers can permit the ASU system to operate at full capacity during an upstream pre-PPU chiller malfunction or trip of the pre-PPU chiller. This can help avoid requiring use of a redundant chiller having to go on-line to cool the compressed air to be fed to the PPU. Such operational flexibility permits a reduction in capital costs, operational costs, and maintenance costs as well as providing improved output for the ASU system 1. Overall profitability for an operator of an ASU system can therefore be greatly enhanced by utilization of an embodiment of the ASU system that utilizes the PPU having absorbers that employ an embodiment of our adsorber.

Embodiments of an adsorber for a pre-purification unit (PPU) of an air separation unit (ASU) system can include a vessel connectable between a compressor system and a heat exchanger and a bed of adsorbent material being positioned in the vessel. The bed of adsorbent material can be configured to remove water (H2O) and carbon dioxide (CO2) from a compressed air flow fed to the PPU and can also be configured to remove nitrous oxide (N2O) so that N2O within the air output from the PPU is below a first pre-selected threshold. The bed of adsorbent material can be configured so that, in response to a pre-PPU chiller being determined to have an issue resulting in the pre-PPU chiller being tripped or requiring the pre-PPU chiller to be taken off-line, the PPU is operable at full capacity such that the N2O within the air output from the PPU exceeds the first pre-selected threshold and is below a second pre-selected threshold associated with CO2 breakthrough.

The first layer of adsorbent material can include a particular type of material or combination of material. In some embodiments, the first layer can include alumina, for example. The second layer of adsorbent material can include a particular type of material or combination of material as well. In some embodiments, the second layer of adsorbent material can include NaX, NaLSX or NaMSX, for example. In some embodiments, the bed of adsorbent material can be structured as a single layer of material or multiple layers of material.

The first pre-selected threshold range and the second pre-selected threshold ranges can differ and be various acceptable ranges that can meet a particular set of design criteria. For example, the first pre-selected threshold can be in a range of 0-0.2 ppm N2O and the second pre-selected threshold can be in a range of 0.2-0.32 ppm N2O or a range of less than 0.4 ppm N2O and more than 0.2 ppm N2O. In some embodiments, the first pre-selected threshold can be selected such that 20%-100% of the N2O within the air fed to the PPU is removed from the air and the second pre-selected threshold can be selected such that less than 50% of the N2O within the air fed to the PPU is removed from the air.

Methods of purifying air via a PPU of an ASU system having a pre-PPU chiller that is upstream of the PPU to cool compressed air before the compressed air is fed to the PPU are also provided. Embodiments of such methods can include passing air through an adsorber of the PPU to pass the air through a bed of adsorbent material within a vessel of the adsorber and, in response to the pre-PPU chiller being determined to have an issue resulting in the pre-PPU chiller being tripped or requiring the pre-PPU chiller to be taken off-line, continuing to operate the ASU system at a full capacity even though nitrous oxide (N2O) within the air output from the PPU exceeds a first pre-selected threshold and is below a second pre-selected threshold associated with carbon dioxide (CO2) breakthrough.

The bed of adsorbent material can include one or more materials. For example, the bed can include alumina, silica gel, 13X, NaX, NaLSX, NaMSX, or combinations thereof having a particulate size range of 1.0 millimeters (mm) to 5 mm. Other embodiments can utilize other types of bed material or other types of particulate size ranges.

Embodiments of the method can include other steps. For example, embodiments can include monitoring a content of CO2 within the air output from the PPU. As another example, embodiments can include taking a remedial action to address excess N2O within the air being output from the PPU after the pre-PPU chiller is back on-line for the ASU system and the air output from the PPU no longer has N2O that exceeds the first pre-selected threshold. This remedial action can be taken immediately after the pre-PPU chiller is back on line or some other type of action that may be taken months or years after the pre-PPU chiller is back on line. For example, the remedial action can include shortening a defrost interval for the ASU system to account for a duration of time at which the ASU system operated with the air output from the PPU having N2O that exceeded the first pre-selected threshold. The shortening of the defrost interval can include decreasing an amount of time until a defrosting of the ASU system is scheduled to occur.

As discussed above, the first and second pre-selected threshold ranges can be selected to meet a particular set of design criteria. For example, the first pre-selected threshold can be in a range of 0-0.2 ppm N2O and the second pre-selected threshold can in a range of 0.2-0.32 ppm N2O or another suitable range. As another example, the first pre-selected threshold can be selected such that 20%-100% of the N2O within the air fed to the PPU is removed from the air and the second pre-selected threshold is selected such that less than 50% of the N2O within the air fed to the PPU is removed from the air.

Embodiments of the method can be implemented so that the continuing to operate the ASU system at the full capacity even though N2O within the air output from the PPU exceeds the first pre-selected threshold and is below the second pre-selected threshold associated with CO2 breakthrough is permitted to occur for a pre-selected duration time period. This pre-selected duration of time can be, for example, a time period that is no more than 14 days, no more than 7 days, or no more than 2 days.

It should be appreciated that the continuing to operate the ASU system at the full capacity even though N2O within the air output from the PPU exceeds the first pre-selected threshold can be performed without a redundant pre-PPU chiller being operated to cool the compressed air before the compressed air is fed to the PPU to replace the pre-PPU chiller determined to have the issue resulting in the pre-PPU chiller being tripped or requiring the pre-PPU chiller to be taken off-line. Embodiments can therefore be implemented without use of redundant pre-PPU chillers having to be included in plants or ASU systems.

Embodiments of an ASU system can include a PPU connectable to a compressor system to receive compressed air from the compressor system. The PPU can be connectable to a heat exchanger to feed air purified via the PPU to the heat exchanger. A pre-PPU chiller can be positioned between the compressor system and the PPU to cool the compressed air output from the compressor system and feed the cooled compressed air to the PPU. The PPU can include at least one embodiment of an adsorber (e.g. an above discussed adsorber). For example, the PPU can include a vessel connectable between the compressor system and the heat exchanger. A bed of adsorbent material can be positioned in the vessel. The bed of adsorbent material can have at least one layer of adsorbent material to remove water from the air, CO2 from air, and N2O from the air so that the air output from the PPU has N2O below a first pre-selected threshold. The ASU system can be configured so that the ASU system is operable at a full capacity even though N2O within the air output from the PPU exceeds a first pre-selected threshold in response to the pre-PPU chiller being determined to have an issue resulting in the pre-PPU chiller being tripped or requiring the pre-PPU chiller to be taken off-line.

Embodiments of the ASU system can include other components. For instance, the ASU system can also include an air separation column assembly positioned to receive the air from the heat exchanger.

Embodiments of the ASU system can be configured so that the ASU system is operable at the full capacity even though N2O within the air output from the PPU exceeds the first pre-selected threshold in response to the pre-PPU chiller being determined to have an issue resulting in the pre-PPU chiller being tripped until the air output from the PPU exceeds a second pre-selected threshold that is greater than the first pre-selected threshold. The second pre-selected threshold can be associated with a CO2 breakthrough condition. In some embodiments, the first pre-selected threshold can be in a range of 0-0.2 ppm N2O and the second pre-selected threshold being in a range of 0.2-0.32 ppm N2O or in a range that is between 0.2 ppm N2O and less than 0.4 ppm N2O. In other embodiments, the first pre-selected threshold can be selected such that 20%-100% of the N2O within the air fed to the PPU is removed from the air and the second pre-selected threshold is selected such that less than 50% of the N2O within the air fed to the PPU is removed from the air. In yet other embodiments, the first and second pre-selected thresholds can be set to other values to accommodate a particular set of design criteria.

Embodiments of the ASU system can be configured to operate at full capacity even though N2O within the air output from the PPU exceeds the first pre-selected threshold and is below the second pre-selected threshold associated with CO2 breakthrough for a pre-selected duration time period. This time period can be, for example, no more than 14 days, no more than 7 days, or no more than 2 days.

Embodiments of the ASU system can be configured so that operation of the ASU system at full capacity occurs even though N2O within the air output from the PPU exceeds the first pre-selected threshold and is performable without a redundant pre-PPU chiller being operated to cool the compressed air from the compressor system before the compressed air is fed to the PPU to replace the pre-PPU chiller determined to have the issue resulting in the pre-PPU chiller being tripped or requiring the pre-PPU chiller to be taken off-line. For example, an ASU system can be utilized that does not use a redundant, backup pre-PPU chiller.

Other details, objects, and advantages of our air separation systems, adsorbers, radial adsorbers, pre-purification systems utilizing one or more adsorbers and methods of making and using the same will become apparent as the following description of certain exemplary embodiments thereof proceeds.

BRIEF DESCRIPTION OF THE DRAWINGS

Exemplary embodiments of air separation systems, adsorbers, radial adsorbers, pre-purification systems utilizing one or more adsorbers and methods of making and using the same are shown in the drawings included herewith. It should be understood that like reference characters used in the drawings may identify like components.

FIG. 7 is a flow chart of an exemplary method of purifying air via a PPU of an air separation unit system having a pre-PPU chiller that is upstream of the PPU to cool compressed air before the compressed air is fed to the PPU.

DETAILED DESCRIPTION

Figure 1:
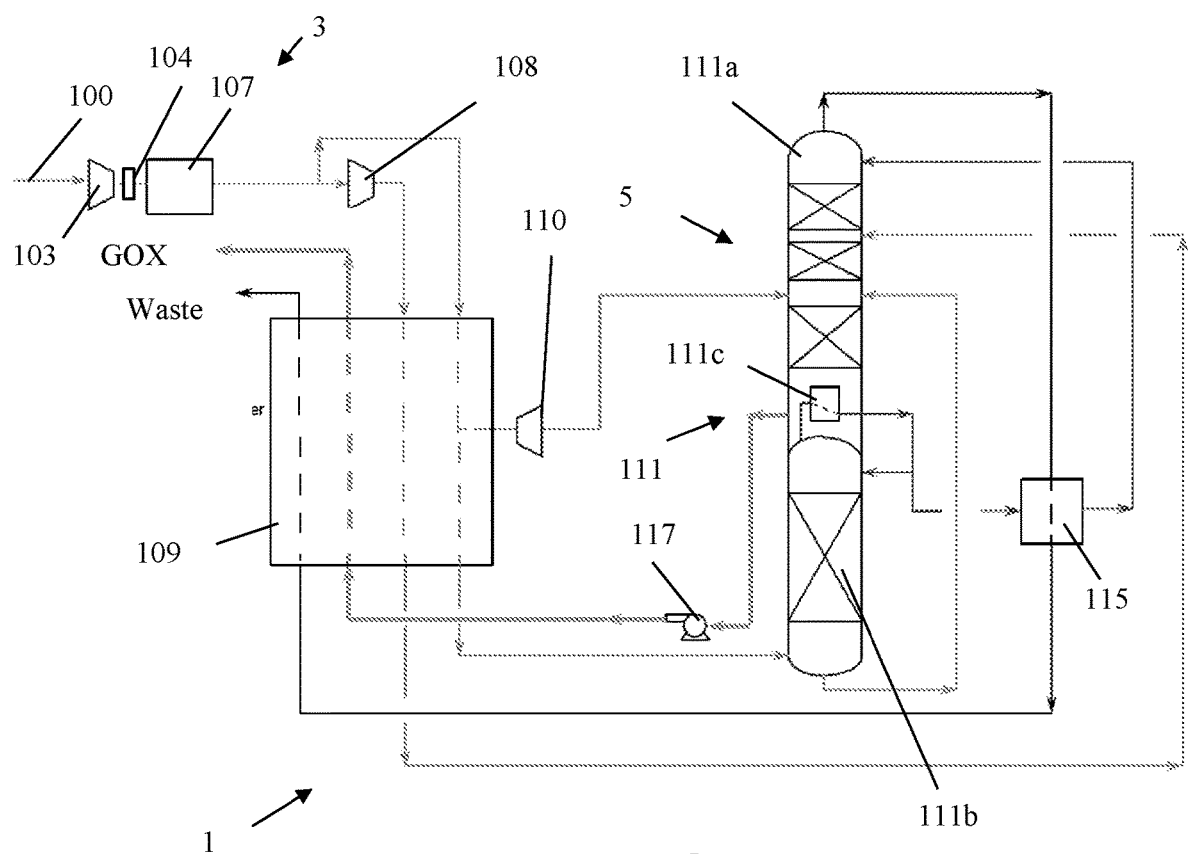
FIG. 1 is a box diagram of a first exemplary embodiment of an air separation unit (ASU) system 1 utilizing an exemplary embodiment of a pre-purification system 3 that purifies an air flow for feeding to an air separation column assembly 5 for separation of the air into oxygen and/or nitrogen flows as well as other flows (e.g. at least one waste flow, and/or argon, and/or krypton, and/or xenon, etc.). In some embodiments, the ASU system 1 can be a plant or can be utilized in a plant.

Referring to FIGS. 1-9 a plant can include an air separation unit (ASU) system 1. The ASU system 1 can be configured as a cryogenic air distillation system for generation of one or more output flows for providing one or more desired products (e.g. oxygen gas, and/or liquid oxygen, and/or nitrogen gas, and/or liquid nitrogen, and/or argon gas, and/or argon liquid, and/or other fluid flows, etc.). In some embodiments, the ASU system 1 can be a plant. In other embodiments, a plant can include the ASU system 1 as a component of a larger facility. For example, the plant that includes the ASU system 1 can be an industrial power plant, a large manufacturing facility, or other type of plant. Embodiments of the plant or ASU system 1 can utilize a controller to help monitor and/or control operations of the plant and/or ASU system 1.

The ASU system 1 can be configured to include a pre-purification system 3 configured to purify an intake flow of air to remove impurities from the air for feeding to an air separation column assembly 5 for separation of the air into one or more product flows of fluid and one or more waste flows of fluid. The one or more product flows can include at least one flow of nitrogen and/or at least one flow of oxygen and can also include one or more flows of argon, xenon, krypton or other air component. The air separation column assembly 5 can also output one or more waste flows of fluid. The waste flows can be emitted to atmosphere and/or used in one or more other plant processes.

The air separation column assembly 5 can include a multiple column assembly 111 that includes a low pressure column 111a positioned above a high pressure column 111b. A reboiler-condenser 111c can be positioned between the high pressure column 111b and the low pressure column 111a in the multiple column tower arrangement. The high pressure column 111b can be considered a first column of the multiple column assembly that operates at a highest pressure of the columns of the multiple column tower assembly. For instance, the high pressure column 111b can operate at a pressure that is higher than the operational pressure of the low pressure column 111a, which can be considered a second column of the multiple column assembly.

In some embodiments, the low pressure column 111a can operate at a pressure of between 1.1 atm and 5 atm, between 1.1 atm and 3 atm or at a pressure that is greater than 1 bar and less than 5 bar, and the high pressure column 111b can operate at a pressure of between 4.5 atm and 15 atm, or at a pressure that is greater than 4 bar and less than 15 bar.

As may best be appreciated from FIG. 1, an intake flow 100 of air can be passed through a compressor system 103 to compress the air to a higher pre-selected pressure. The pressurized air can be output from the compressor system 103 and fed to a pre-purification unit (PPU) 107 of a pre-purification system 3 via a compressed air feed conduit. The PPU 107 can be configured to purify the compressed flow of air output from the compressor system 103 to remove impurities from the air. The PPU 107 can be configured as an adsorption system that is designed to remove undesired impurities from the air such as, for example, carbon dioxide ($CO_2$), carbon monoxide (CO), water ($H_2O$), hydrocarbons (e.g. butane, ethylene, etc.), and nitrous oxide ($N_2O$), for example.

A pre-PPU chiller 104 can be positioned between the compressor system 103 and the PPU 107 to cool the compressed air to a temperature within a pre-selected PPU temperature or PPU temperature range before the compressed air is fed to the PPU 107. The pre-PPU chiller 104 can be (or include) a chiller, a mechanical chiller, an absorption chiller or other type of chiller. It should be appreciated that a chiller can also be referred to as a cooler.

The temperature of the compressed air output from the compressor system 103 can be in the range of 10° C.-25° C., 15° C.-30° C., or 5° C.-50° C. The pre-PPU chiller 104 can be configured to cool this compressed air flow to a pre-selected PPU feed temperature that falls within a PPU feed temperature range of 5° C.-15° C., 5° C.-20° C., or 10° C.-20° C. The cooled compressed air fed to the PPU can be at this cooled temperature or temperature range. When the pre-PPU chiller 104 trips and the pre-PPU chiller is taken off-line or operated at a reduced capacity, the compressed air fed to the PPU 107 can be fed to the PPU at a temperature that is above this range. For instance, the compressed air can be fed to the PPU 107 at a temperature in the range of 10° C.-25° C., 15° C.-30° C., or 5° C.-50° C. when the pre-PPU chiller 104 trips (e.g. due to a mechanical failure, compressor failure, pump failure, leak, blockage, etc. as discussed herein, etc.).

Figure 8:
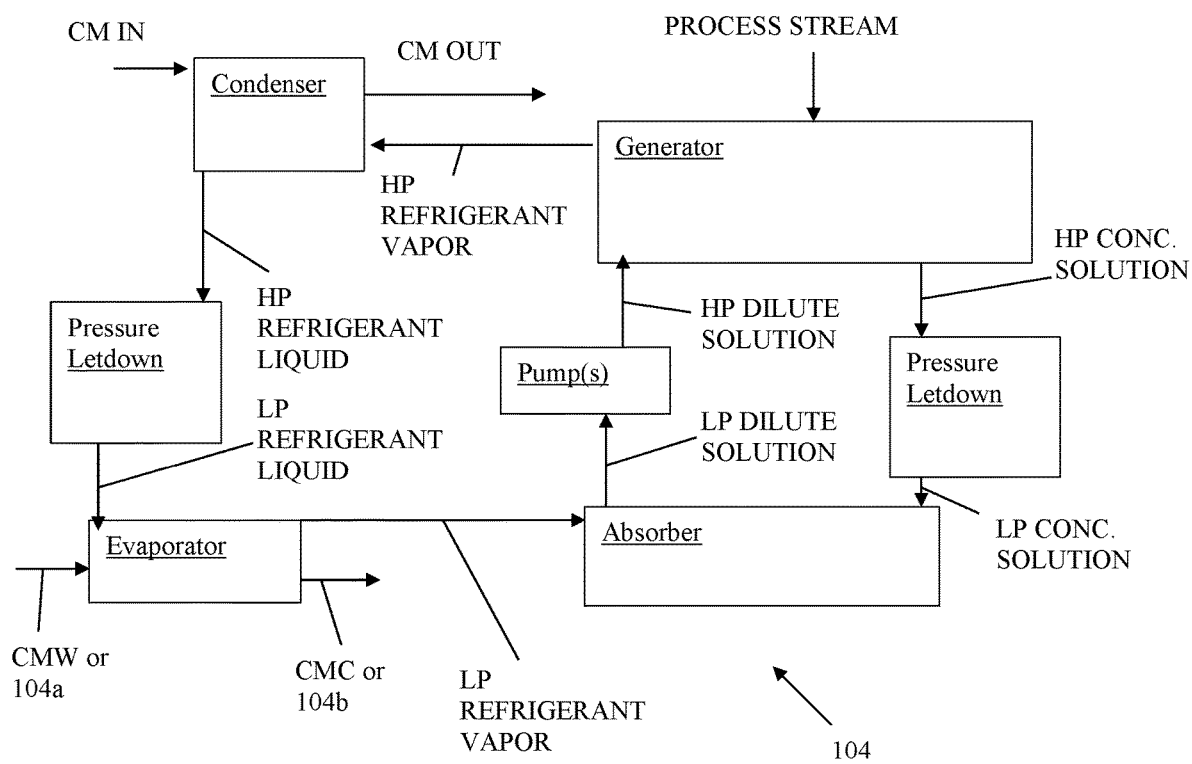
FIG. 8 is a block diagram of an exemplary pre-PPU chiller 104 that can be utilized in the first exemplary embodiment of the ASU system 1 and can also be utilized as an exemplary cooling medium chilling system (CMCS) in the pre-PPU chiller 104 shown in FIG. 9.
Figure 9:
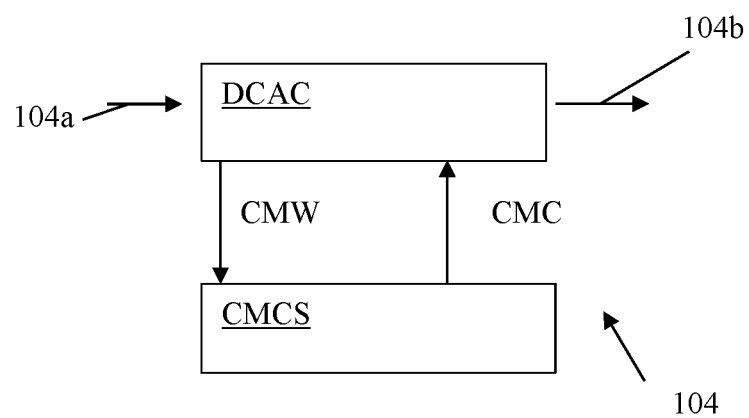
FIG. 9 is a block diagram of an exemplary pre-PPU chiller 104 that can be utilized in the first exemplary embodiment of the ASU system 1.

FIGS. 8-9 illustrates an exemplary pre-PPU chiller 104 that can be utilized in the ASU system 1. The pre-PPU chiller can receive an output flow of compressed air 104a from the compressor system 103 and output a chilled compressed air flow 104b for feeding that chilled, compressed air flow to the PPU 107. It should be appreciated that other types of absorption chillers or mechanical chillers can also be utilized (e.g. multi-stage absorption chillers, other types of single stage absorption chillers, single or multi stage mechanical chillers, etc.). Referring to FIGS. 8-9, the pre-PPU chiller 104 can include a condenser, a generator, pump(s) (e.g. at least one pump), pressure letdowns (e.g. pressure letdown valves), an absorber, and an evaporator. Embodiments can also utilize a first pump as well as a second pump can operate in parallel with the first pump or be provided as a secondary pump that can come on-line whenever the first pump goes off line due to a malfunction, error, or maintenance.

As may be appreciated from the exemplary embodiment of FIG. 8, the chiller 104 can be configured so that at least one ASU system process stream or other stream of a plant (PROCESS STREAM) is fed to the generator of the pre-PPU chiller 104. The ASU system process stream can be, for example, a low pressure steam (e.g. steam that is at 8-10 bar pressure, or steam that is at or below 10 bar, steam that is at 800 kPa to 1,000 kPa or is at or below 1,000 kPa, etc.), or can be hot liquid water (e.g. water that is heated but in a liquid state), or may be another flow of fluid a section of the ASU system 1 that may be a waste flow of fluid (e.g. heated gas from a gasifier, etc.). In yet other embodiments, the process stream fed to the generator of the chiller 104 can be intermediate pressure steam or high pressure steam that is output as a waste stream.

The pre-PPU chiller 104 can be positioned so that the generator outputs a high pressure refrigerant vapor (HP REFRIGERANT VAPOR) to the condenser to condense a condenser medium inlet fluid (CM IN) fed to the condenser for condensing the refrigerant. The refrigerant may be water, glycol, or other suitable refrigerant. The condenser medium can be water, ambient air, or other type of fluid flow for condensing the refrigerant vapor. The condensed condenser medium can be output from the condenser (CM OUT) for being sent to another plant unit (e.g. a wash tower or a water reservoir if the cooling medium is water, etc.) of the ASU system 1. The high pressure refrigerant vapor may be condensed into a liquid when passed through the condenser and output as a high pressure refrigerant liquid (HP REFRIGERANT LIQUID) that can then be fed to a pressure letdown for lowering the pressure of the refrigerant so it is a low pressure refrigerant liquid (LP REFRIGERANT LIQUID) that can be fed to the evaporator of the chiller 104. The low pressure refrigerant may be vaporized in the evaporator as the refrigerant absorbs heat from the flow of compressed air 104a to be cooled by the chiller or a cooling medium for a cooler that is to cool the compressed air that is also passed through the evaporator in co-current or countercurrent flow with the refrigerant passed through the evaporator. The flow of compressed air 104a is cooled in the evaporator and output as an output from the evaporator as a flow of chilled compressed air 104b for feeding to the PPU 107. A flow of cooled cooling medium output from the evaporator can be a cooled cooling medium flow (CMC).

The low pressure refrigerant vapor output from the evaporator (LP REFRIGERANT VAPOR) can be fed to the absorber. The absorber can receive a low pressure concentrate solution (LP CONC. SOLUTION) so that the low pressure refrigerant vapor absorbs this solution such that the absorber can output a low pressure diluted solution (LP DILUTE SOLUTION) of the refrigerant for feeding to the first pump or the second pump (e.g. Pump(s) shown in FIG. 8) for forming a high pressure dilute solution (HP DILUTE SOLUTION) for feeding to the generator.

The generator can be configured to use the heat of at least one process stream (PROCESS STREAM) to form the high pressure refrigerant vapor from the high pressure dilute solution it receives via the pump(s). The generator can also output a high pressure concentrated solution (HP CONC. SOLUTION) for feeding to a pressure letdown so that the low pressure concentrate solution (LP CONC. SOLUTION) can be fed to the absorber as part of the refrigerant circuit of the chiller.

It should be appreciated that the evaporator of the pre-PPU chiller 104 can be arranged and configured as a single stage chiller or a multi stage chiller. For example, the pre-PPU chiller 104 can be a multiple stage chiller that has other stages configured to cool other process flows in of the ASU system 1. As another example, the pre-PPU chiller can be a single or multiple stage chiller that cools the output flow of compressed air 104a in multiple stages before outputting the cooled compressed air flow 104b to be fed to the PPU 107.

As discussed herein, the pre-PPU chiller 104 can be configured to include a direct contact cooler (DCAC) that receives cooled water or other cooling medium from a cooling medium chilling system (CMCS) for contacting with the output flow of compressed air 104a for cooling that air for outputting the cooled compressed air flow 104b to be fed to the PPU 107. An example of the CMCS is shown in FIG. 8. A mechanical chiller can also be utilized as a CMCS.

In embodiments of the pre-PPU chiller 104 can be configured to include a direct contact cooler (DCAC) that receives cooled water or other cooling medium from a cooling medium chilling system (CMCS), the evaporator of the pre-PPU chiller 104 can chill the warmed water or other cooling medium (CMW) of the direct contact cooler (DCAC) of the pre-PPU chiller 104 for cooling that cooling medium before it is recycled for repeated use in the direct contact cooler of the pre-PPU chiller 104. The cooled cooling medium (CMC) can be output from the cooling medium chilling system (CMCS) of the pre-PPU chiller 104

The pre-PPU chiller 104 can be designed so that the temperature difference across the chiller can meet a particular set of processing design criteria parameters. These parameters may be as desired based on the process conditions, such as ambient temperature of the feed air received at the compression system 103, the CO2 concentration of the feed, etc. The pre-PPU chiller 104 can be configured so that it can receive the output flow of compressed air 104a, which may be at a first pre-chiller temperature (e.g. a temperature within the range of 5° C.-50° C. or 10° C.-25° C., etc.) and output the cooled compressed air flow 104b to be fed to the PPU 107 at a first pre-selected PPU temperature (e.g. a temperature in the range of 5° C.-20° C., 5° C.-15° C. or 10° C.-20° C., etc.)

The purified compressed air can be output from the PPU 107 and fed to a main heat exchanger 109 via a heat exchanger feed conduit. Prior to being fed to the main heat exchanger 108, the purified, compressed air can be fed from the PPU 107 to a booster compressor 108 for further compressing at least a portion of the purified, compressed air output from the PPU 107 to a higher pressure. In such embodiments, the entirety of the compressed purified air output from the PPU 107 can undergo further compression or the flow can be split so that a first portion of the compressed, purified air output from the PPU 107 is fed directly to the main heat exchanger 109 while a second portion of the air output from the PPU 107 is fed to the booster compressor to undergo further compression to a higher pressure before that second portion is fed to the main heat exchanger 109. A booster compressor feed conduit and booster compressor output conduit can be arranged to facilitate the feeding of fluid to the booster compressor 108 form the PPU 107 and the output of the further compressed air from the booster compressor 108 to the main heat exchanger 109.

In other embodiments, the booster compressor 108 may not be utilized and an entirety of the air output from the PPU 107 can be fed to the main heat exchanger 109 via a main heat exchanger feed conduit.

The main heat exchanger 109 can be configured to cool the compressed, purified air. The cooling can be provided via one or more flows of fluid output from the air separation column assembly 5. For instance one or more flows of nitrogen fluid and/or oxygen fluid can be output from the air separation column assembly 5 so the one or more fluid flows are passed through the main heat exchanger 109 to function as a cooling medium for cooling the compressed, purified air. The flows of fluid from the air separation column assembly 5 can include at least one flow of nitrogen and at least one flow of oxygen (e.g. a flow of liquid oxygen, LOX). These flows of fluid output from the air separation column assembly 5 can be warmed by the compressed, purified air as they pass through the main heat exchanger 109. For example, in embodiments in which a LOX flow is fed to the main heat exchanger 109 as a cooling medium, this LOX flow may be heated so that it is output from the main heat exchanger 109 as a gaseous oxygen flow, GOX.

The cooled air can be output from the main heat exchanger 109 for being fed to the air separation column assembly 5 via at least one air separation column assembly feed conduit. The first portion of the compressed, purified air can be fed to a high pressure (HP) column 111b of the air separation column assembly 5. A portion of this first portion can be split therefrom to form a third portion of feed air. This third portion can be output from the main heat exchanger 109 and fed to an expander 110 to reduce the pressure of the third portion and also reduce the temperature of this portion of the air. The third portion of air can then be fed from the expander 110 to the low pressure (LP) column 111a of the air separation column assembly 5.

The second portion of the compressed and purified air (the portion that may be further compressed via the booster compressor 108) can be output from the main heat exchanger and fed to the LP column 111a as well. Of course, in embodiments that do not utilize the booster compressor 108, this second portion of air may not be present. In such embodiments, if the third portion of air that is fed to the expander 110 via splitting of the first portion of the compressed purified air fed to the main heat exchanger 109 is utilized, this third portion can be considered a second portion of the air instead of a third portion.

The HP column 111b can be positioned and configured to process the cooled first portion of the purified and pressurized air that is fed to the HP column 111b to form a first HP nitrogen-enriched vapor stream that is fed to the first reboiler-condenser 111c. In some embodiments, the HP nitrogen-enriched vapor stream can include 100-99 volume percent (vol. %) nitrogen or at least 95 vol. % nitrogen.

The HP column 111b can also form a first HP oxygen-enriched stream. The HP oxygen-enriched stream can be a fluid that is liquid, vapor, or a combination of liquid and vapor. In some embodiments, the HP oxygen-enriched stream can include 30-40 vol. % oxygen, and 1-3 vol. % argon, and the balance nitrogen (e.g. 69-57 vol. % nitrogen).

The first HP nitrogen-enriched vapor stream can be fed to the reboiler-condenser 111c to from an HP condensate flow that can be split into multiple portions via a conduit arrangement that includes at least one valve or other flow splitting mechanism. For instance, a first portion of the HP condensate flow can be output from the first reboiler-condenser 121 and subsequently recycled back to the HP column 111b as an HP reflux stream via a HP reflux stream conduit.

A second portion of the HP condensate flow can be output from the reboiler-condenser 111c and then fed to a subcooler 115 via a subcooler feed conduit. The subcooler 115 can be a heat exchanger that can cool the second portion of the HP condensate flow so that this second portion is at a lower temperature that is suitable for feeding to the LP column 111a as a nitrogen-enriched LP feed that is fed to the LP column 111a via a nitrogen-enriched LP feed conduit extending from the subcooler 115 to the LP column 111a. The second portion of the HP condensate flow can be reduced in pressure for feeding to the LP column (e.g. via a valve of the nitrogen-enriched LP feed conduit extending from the subcooler 115, and/or via a pressure reduction mechanism included in this conduit). The nitrogen-enriched LP feed can be a substantially nitrogen-enriched liquid feed (e.g. be entirely liquid, be at least 90% by volume liquid, be at least 80% by volume liquid, etc.).

The first HP oxygen-enriched stream can be fed to the subcooler 115 (not shown) to undergo cooling. Alternatively, the first HP oxygen-enriched stream can forego such cooling via the subcooler 115. In some embodiments, the first HP oxygen-enriched stream can be passed through an HP oxygen-enriched stream conduit extending from the HP column 111b that is configured so that the HP oxygen-enriched stream output from the HP column 111b can be reduced in pressure via a pressure reduction mechanism (e.g. an expander, a valve, etc.) and subsequently fed to the LP column 111a as a substantially liquid oxygen-enriched feed to the LP column 111a.

Reflux for the LP column 111a can be provided via the nitrogen-enriched LP feed that is fed to the LP column 111a via a nitrogen-enriched LP feed conduit extending from the subcooler 115 to the LP column 111a. As discussed above, this nitrogen-enriched LP feed can be formed via the second portion of the HP condensate flow output from the reboiler-condenser 111c. There may be additional liquid provided via one or more of the oxygen-enriched feeds fed to the LP column 111a.

Rising vapor, or column boil-up for the LP column 111a can also be formed via the reboiler-condenser 111c and can be fed to the LP column 111a such that the vapor (or gas) within the LP column 111a flows in counter-current flow to the liquid fed to the LP column 111a (e.g. the nitrogen-enriched LP feed flows downwardly as the rising vapor flows upwardly in the LP column 111a, etc.).

The LP column 111a can operate to output multiple separated flows of fluid. Some of these flows of fluid can be considered nitrogen waste streams of fluid that may be predominantly comprised of nitrogen gas and/or nitrogen liquid (e.g. be at least one nitrogen-enriched waste stream). For example, the LP column 111a can operate to output an upper vapor waste stream and a first LP oxygen-rich liquid stream. In at least some embodiments, the LP column 111a can also output a top nitrogen-rich vapor output stream (not shown), a first argon-enriched vapor stream (not shown), as well as one or more other output flows.

The upper vapor waste stream can be output from the LP column 111a and fed to the subcooler 115 to function as a cooling medium for cooling the second portion of the HP condensate flow output from the reboiler-condenser 111c and fed to a subcooler 115 via the subcooler feed conduit. This waste vapor stream can then be output from the subcooler 115 and fed to the main heat exchanger 109 to function as a cooling medium therein as well before being output from the main heat exchanger 109 as a waste stream that may be emitted to the atmosphere or otherwise used in the plant to which the ASU system 1 may be connected (e.g.

for mixing with a flue gas or to pass through another heat exchanger for subsequent use in the plant etc.).

The first LP oxygen-rich liquid stream output from the LP column 111a can be fed to a pump 117 to increase the pressure of this flow before it is fed to the main heat exchanger 109 to function as a cooling medium. The warmed oxygen-rich stream can be output from the main heat exchanger as a GOX stream in some embodiments.

Figure 2:
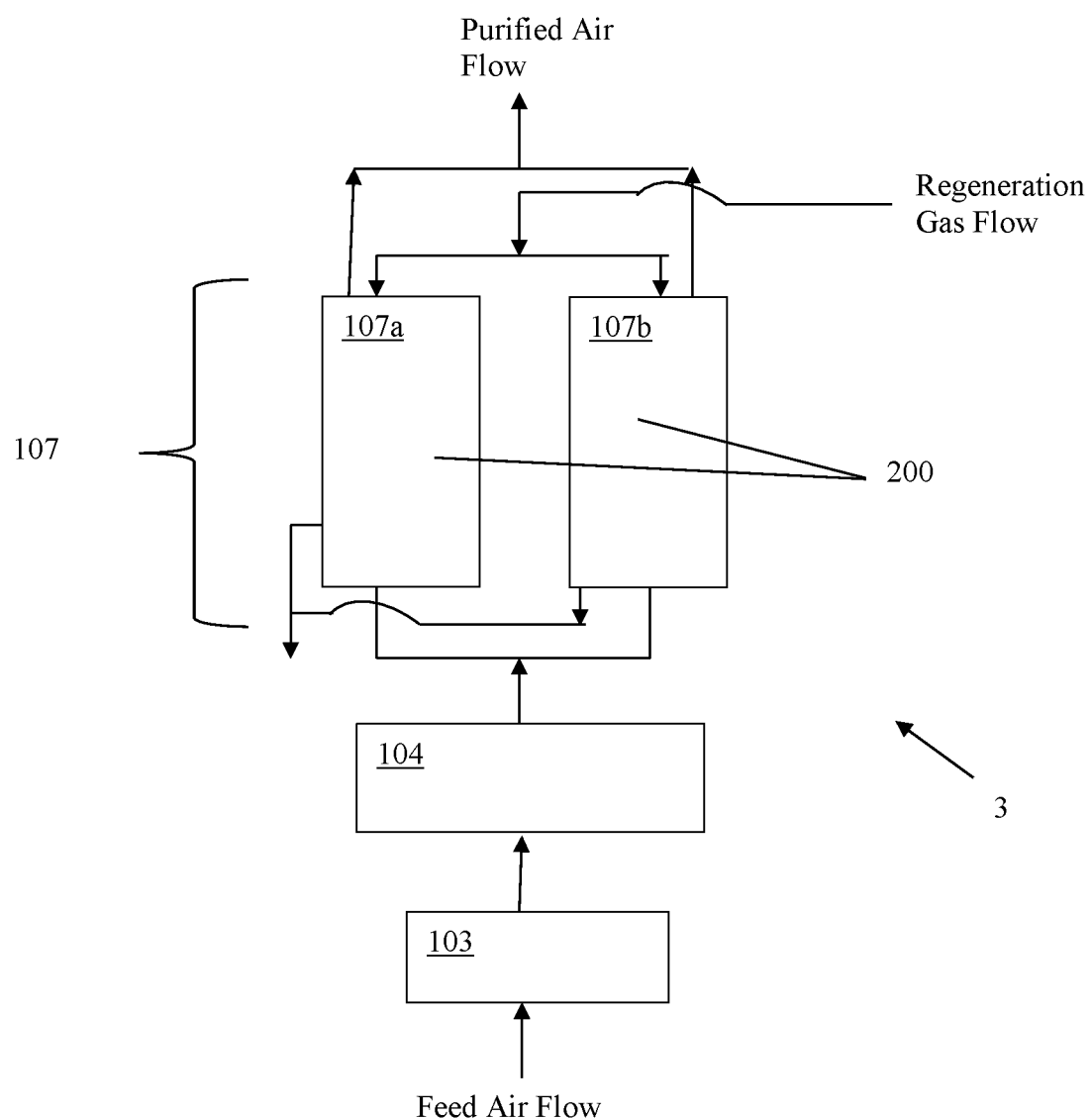
FIG. 2 is a schematic view of a first exemplary embodiment of a pre-purification unit 107 of the pre-purification system 3 of the first exemplary embodiment of the ASU system 1.

As may best be appreciated from FIG. 2, the PPU 107 of the pre-purification system 3 can include multiple adsorbers 200. Each adsorber 200 of the PPU 107 can include layers of adsorbent material that can remove multiple target elements from the compressed air fed to the PPU 107 via absorption (e.g. catalyst material). The adsorbers of the PPU 107 can include a first adsorber 107a and a second adsorber 107b. The first and second adsorbers 107a and 107b can each be configured as a radial adsorber, a vertical adsorber, a vertical cross flow adsorber, or a horizontal adsorber. In some arrangements, the radial adsorbers can be configured in such that the feed flow comes in from the bottom or the adsorber vessel and the output flow is output out the top or the vessel, or such that the feed flow comes in from the bottom or the vessel and the output flow is passed out of the bottom of the vessel. The PPU 107 can utilize an arrangement of adsorbers 200 so they are configured to utilize a thermal swing adsorption process and/or a pressure swing adsorption process.

The first and second radial adsorbers 107a and 107b can be arranged within the PPU 107 so that they operate in parallel. When the first adsorber 107a is on-stream carrying out purification processes by adsorbing target materials from the air fed to the PPU 107, the second adsorber 107b can be off-stream for purification so that it can undergo thermal regeneration for regeneration of the bed 221 of the adsorbent material of the adsorber 200.

When the second adsorber 107b is on-stream carrying out purification processes by adsorbing target materials from the air fed to the PPU 107, the first adsorber 107a can be off-stream so it can undergo thermal regeneration for regeneration of the bed 221 of adsorbent material of the adsorber 200. A regeneration gas flow can be fed to the off-stream state adsorber(s) of the PPU 107 to regenerate the adsorbent material of the adsorber by heating the material so that the impurities adsorbed therein are released and output from the adsorber via the regeneration gas.

The PPU 107 can be configured so that the input of fluid into the first or second adsorber is changed (e.g. via valve position changes, etc.) to switch the parallel adsorbers between their on-stream states and their off-stream states (e.g. when the first adsorber is on-stream, the second adsorber can be off-stream and vice versa). The regeneration gas flow can be gas obtained via a waste flow output from the LP column 111a or can be gas from another source of a plant or the ASU system 1.

In some embodiments, there can be multiple first adsorbers that may work in series and also multiple second adsorbers that work in series or in another type of arrangement for purification of the compressed air. This can be appreciated from the schematical representation provided in FIG. 2's schematic illustration of the first and second adsorbers 107a and 107b. For such embodiments, the multiple first adsorbers can be arranged so that fluid is passed through each first adsorber one after the other or so that split portions of the fluid to be purified via PPU 107 is passed through respective first adsorbers when they are in their on-stream state. Similarly, the multiple second adsorbers can be arranged so that fluid is passed through each second adsorber one after the other or so that split portions of the fluid to be purified via the PPU 107 is passed through respective second adsorbers when they are in their on-stream state. Such arrangements of first and second adsorbers 107a and 107b can be configured to permit first adsorbers 107a to be in an on-stream state while second adsorbers 107b are in an off-stream state and vice versa.

Each adsorber 200 of the PPU 107 (e.g. first adsorber 107a, second adsorber 107b, etc.) can include a bed 221 of adsorbent material retained within a vessel that includes one or more layers of adsorbent material. A first adsorbent layer of a first bed 221 of adsorbent material can be configured via composition, layer thickness, particle size, pore volume, density, and/or chemical structure (e.g. how cations connect to the zeolite framework), etc. to selectively remove ambient moisture and can also remove CO2 and/or other impurities and a second adsorbent layer of the first bed 221 can be configured via composition, layer thickness, particle size, pore volume, density, and/or chemical structure (e.g. how cations connect to the zeolite framework), etc. to selectively remove carbon dioxide (CO2), nitrogen oxide (N2O), heavy hydrocarbons and/or other fluid constituents from the compressed air fed to the PPU 107 when the adsorber 200 is in the on-stream state. In other embodiments, the adsorber vessel can have a single layer 231 that can include adsorbent material or a combination of adsorbent materials for removal of moisture, CO2, N2O, heavy hydrocarbons and/or other fluid constituents from the compressed air fed to the PPU 107 when the adsorber 200 is in the on-stream state.

It should be appreciated that when an adsorber 200 is in an off-stream state, it can undergo a regeneration process to regenerate the one or more layers of adsorbent material within the adsorber. When returned to the on-stream state, the adsorber can operate with improved efficiency due to the regeneration of the one or more layers of material (e.g. adsorbent material) as the regeneration of the material can return that material to a condition that is close to or at its original state for adsorption of target material from a fluid flow.

For at least some embodiments, the regeneration gas flow can pass through the vessel 203 of an absorber 200 along a flow path that is the reverse of the flow path 210 of fluid passed through the vessel of the adsorber when the adsorber is in the on-stream state. For such embodiments, the inlet 201 of the vessel during the on-stream state may function as an outlet for the regeneration gas and the outlet 202 of the vessel during the on-stream state may function as an inlet for the regeneration gas.

The PPU 107 can be arranged so that the compressed air output from the one or more compressors of the compressor system 103 can then be fed to the adsorber(s) 200 of the PPU 107 via at least one conduit extending from the compressor system 103 or pre-PPU chiller 104 (when utilized) for purification of the air via one or more on-stream adsorbers 200 of the PPU 107.

The compressed air passes through adsorbent beds of each on-stream adsorber of the PPU 107, undesired components of the fluid stream such as ambient moisture, CO2, N2O, hydrogen, carbon monoxide, heavy hydrocarbon components etc. can be completely or partially removed. The purified air can be output from the PPU 107 to be fed to the main heat exchanger 109 as discussed above, for example.

For operation of the PPU 107, CO2 can be utilized as a controlling component of the compressed air for monitoring of the purification of the compressed air. An analyzer or other type of sensor can be positioned to detect the CO2 content of the purified air output from the PPU 107 to determine when the adsorbent material of the on-stream state adsorber(s) is saturated to trigger switching of the on-stream state adsorber(s) to an off-stream state while also switching the off-stream state adsorber(s) to the on-stream state. In some embodiments, the analyzer can be positioned in communication with an outlet 202 of an adsorber 200 or can be positioned in a conduit through which purified air passes as it is output from the PPU 107 and fed to the heat exchanger 109.

The switching of the on-stream state adsorber(s) and off-stream state adsorber(s) can be triggered in response to a detection of the CO2 content of the purified air output from the PPU 107 being at or above a pre-selected threshold. In other embodiments, the concentration of a different impurity or the concentration of multiple different impurities within the purified air output from the PPU 107 can be utilized to trigger the switching of on-stream state and off-stream state adsorbers of the PPU 107.

Figure 3:
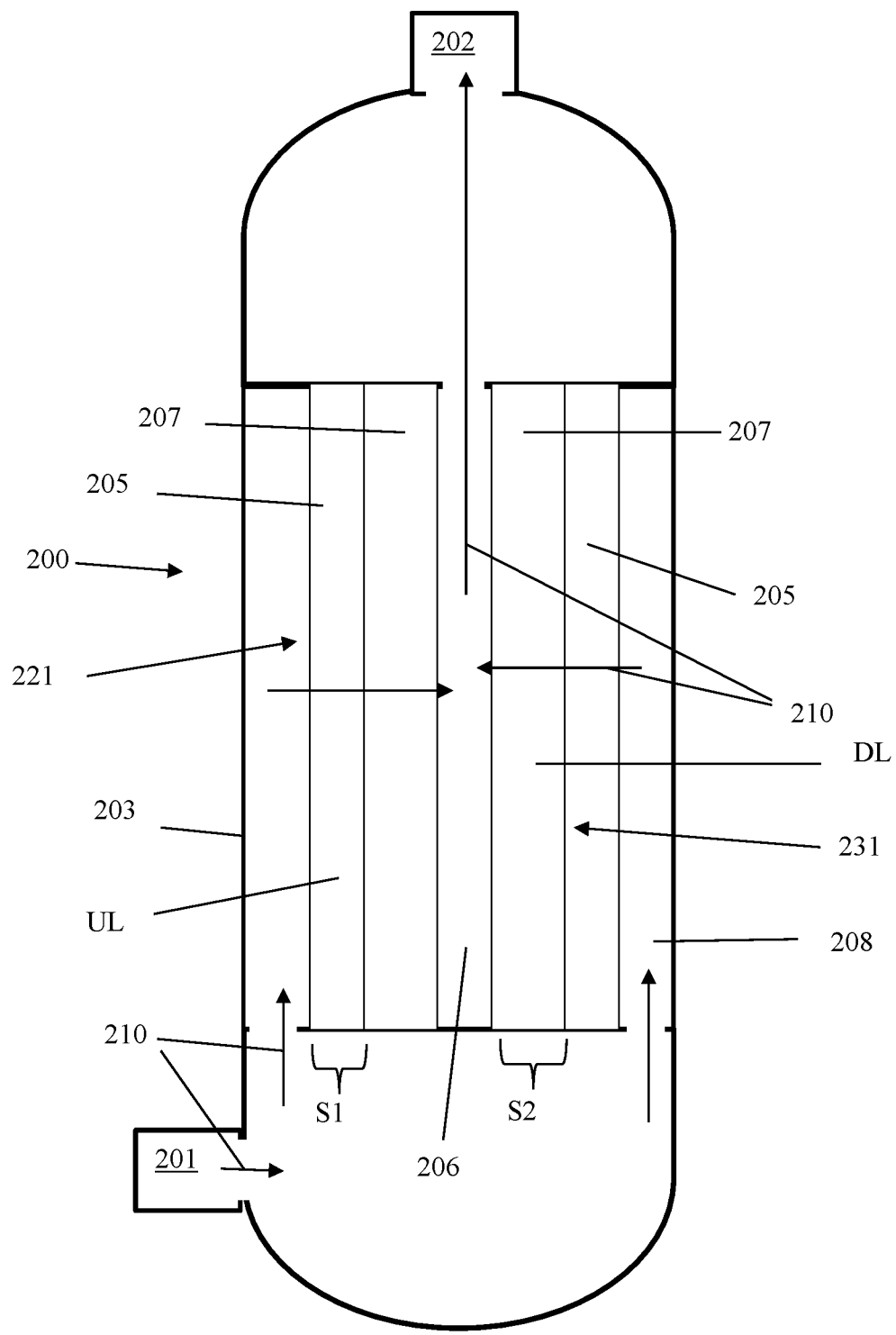
FIG. 3 is a schematic view of a first exemplary embodiment of an adsorber 200 that can be included in the pre-purification unit 107 of the pre-purification system 3 of the first exemplary embodiment of the ASU system 1.
Figure 4:
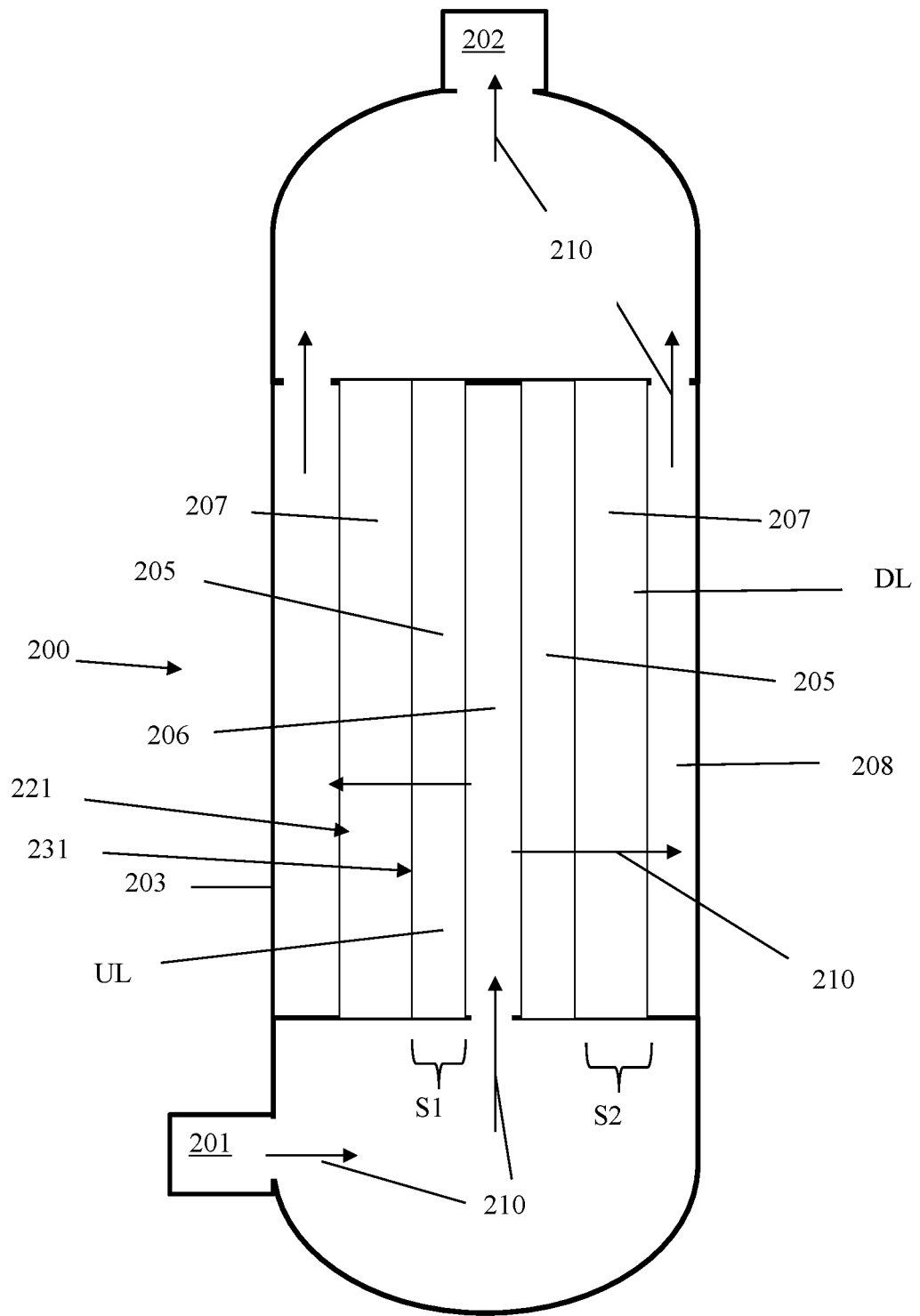
FIG. 4 is a schematic view of a second exemplary embodiment of an adsorber 200 that can be included in the pre-purification unit 107 of the pre-purification system 3 of the first exemplary embodiment of the ASU system 1.
Figure 5:
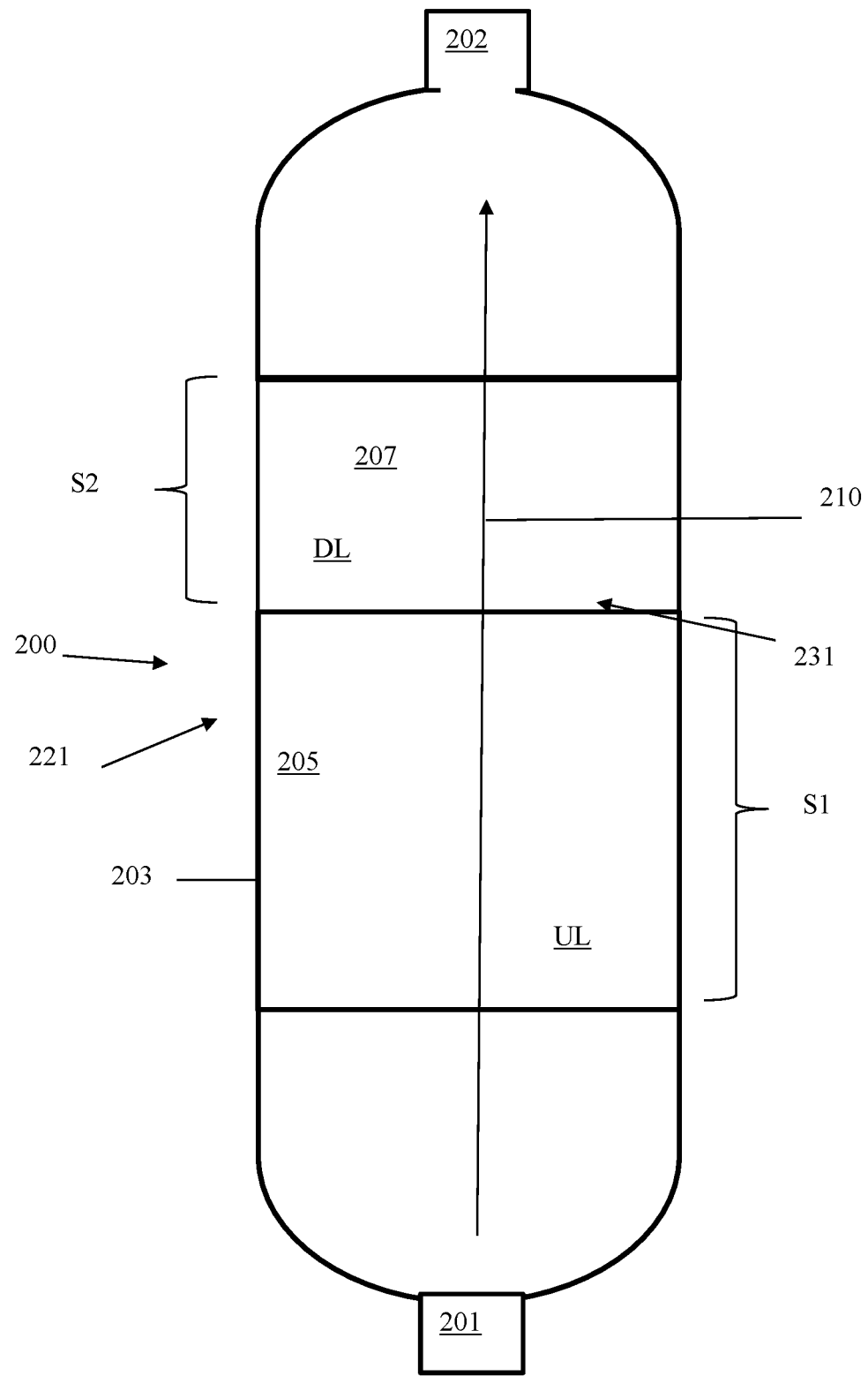
FIG. 5 is a schematic view of a third exemplary embodiment of an adsorber 200 that can be included in the pre-purification unit (PPU) 107 of the pre-purification system 3 of the first exemplary embodiment of the ASU system 1.
Figure 6:
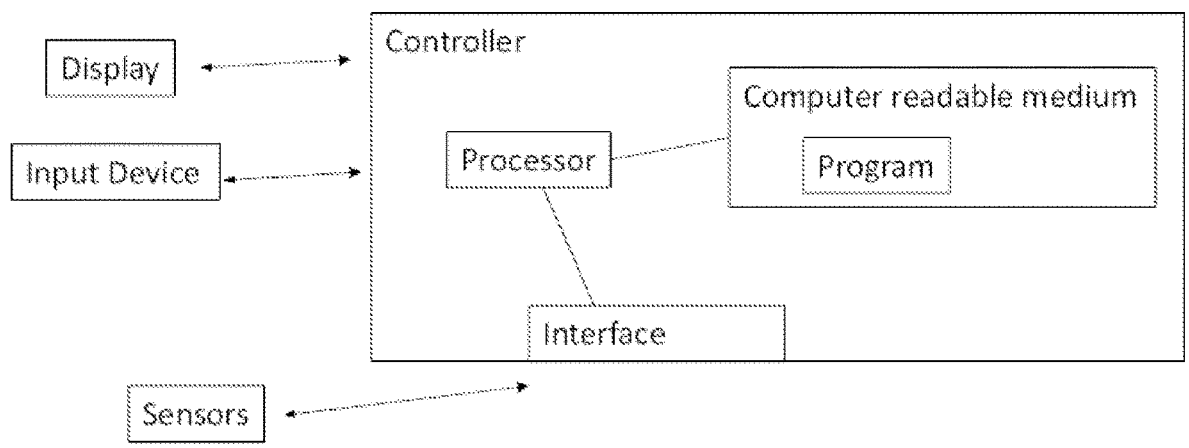
FIG. 6 is a block diagram of an exemplary controller that can be utilized in the first exemplary embodiment of the ASU system 1.

As may best be seen in FIGS. 3, 4, and 5, the vessel 203 of each adsorber 200 can be structured so that the air to be purified passes through the vessel along a defined flow path 210 illustrated via arrows in FIGS. 3, 4, and 5 for passing between different adsorbent material regions of the chamber of the vessel 203 for passing through the layers of adsorbent material.

As can be appreciated from FIGS. 3-4, the vessel of a radial adsorber 200 can include an inlet 201 that receives compressed air to be purified via adsorption and an outlet 202. The inlet 201 can be positioned at a side of the vessel or at an inlet end of the vessel 203 at a head of the vessel 203. The outlet 202 can be at an end of the vessel or at a side of the vessel. The adsorbers 200 of the PPU 107 can have different configurations to define different flow paths 210 for the flow of air within the vessel 203 between the inlet 201 and the outlet 202.

For example, as may be appreciated from FIG. 3, the inlet 201 can be in fluid communication with an outer annular conduit structure 208 of the vessel and the outlet 202 can be in fluid communication with an inner conduit structure 206. For the embodiment shown in FIG. 3, the flow path 210 that can be defined within the vessel 203 of the adsorber 200 when operating in the on-stream state can include:
(i) the air passing from the inlet 201 into the vessel 203 along a first flow segment of flow path 210,
(ii) then the air passing through the first outer annular conduit 208 defining an initial fluid feed path for the air along a second flow segment of flow path 210,
(iii) then the air passing through a first layer of material 205 along a third flow segment of flow path 210,
(iv) then the air passing through a second layer of material 207 positioned downstream of the first layer 205 (e.g. above the first layer for vertical oriented vessels or positioned to a downstream side of the first layer downstream of the first layer for a horizontally oriented vessel) along a fourth flow segment of flow path 210,
(v) then the air passed out of the second layer of material 207 to the first inner conduit 206 along a fifth flow segment of flow path 210, and
(vi) then the air passing from the first inner conduit 206 to the outlet 202 along a sixth flow segment of flow path 210 for outputting purified air from the vessel 203 after that air has been passed through and contacted the first and second layers of material 205 and 207.

The first outer annular conduit 208 can have at least one inlet opening to receive air from the inlet 202 and least one outlet opening adjacent an outer side of the first layer of material 205 for passing fluid from the first outer annular conduit 208 to the first layer of material 205.

The first inner conduit 206 can be a conduit having an internal channel that is in fluid communication with one or more openings adjacent the inner side of the second layer of material 207 for receiving the air from that layer for outputting air from the second layer of material 207 to the outlet 202.

It should be understood that the first inner conduit 206 and the first outer annular conduit 208 can each be structured as conduit-type structures within the cavity or chamber of the vessel 203 that can each define a passageway for fluid (e.g. air) to guide the fluid along a flow segment of the flow path 210 within the cavity or chamber of the vessel 203. For example, the first outer annular conduit 208 can be defined to be an annular shape that extends between the inlet 201 and an outer side of the first layer of material 205 of the adsorbent material bed 221 to guide fluid from the inlet 201 to the first layer of material 205. The inner conduit 206 can be an inner conduit positioned to guide the air from an inner side of the second layer of material 207 of the adsorbent material bed 221 to the outlet 202.

The first layer of material 205 can be positioned within a first receptacle of the vessel 203 and include first material that differs from the second material of the second layer of material 207 retained within a second receptacle of the vessel 203. When the absorber operates in the on-stream state, the first layer of material 205 can be considered an upstream layer UL and the second layer of material 207 can be considered a downstream layer DL.

Each layer of material can be retained in a receptacle having one or more holes for permitting fluid to be passed into and out of the receptacle. The one or more holes can be defined by one or more screen elements of the receptacles in some embodiments. Each of the receptacles that retain a layer of material can include one or more screens, mesh, at least one plate having multiple holes, or at least one perforated membrane of material having a particular pre-selected geometry for defining at least a portion of the receptacle. Each receptacle can also be another type of receptacle structure that can retain a layer of material in a desired location within the vessel 203 while also allowing the air to pass into and out of the layer to fluidly connect the first outer conduit 208 with the first inner conduit 206 for passage of the air along the flow path 210.

The material of the first and second layers 205 and 207 can be different types of particulate material (e.g. zeolite material, catalyst material, adsorbent material, etc.). The first layer of material 205 can include alumina and/or silica or other material for adsorption of at least water and CO2. The first layer of material can include material that is designed to primarily adsorb the water and CO2 to preferentially remove these impurities from the air so all, or almost all of the CO2 and water is removed from the air within this first layer of material 205 of the adsorbent material bed 22 during normal operation of the ASU system 1 when the pre-PPU chiller 104 is operating in a non-tripped condition (e.g. at its normal operational condition).

The material of the second layer of material 207 can be a molecular sieve adsorbent material. This material of the second layer of material can include 13X, NaX, NaMSX, NaLSX, and/or other molecular sieve material. The material of the second layer of material or the adsorbent material bed 221 can be configured to adsorb heavy hydrocarbons (e.g. butane, acetylene, ethylene, propylene, etc.), N2O, CO, as well as any remaining water and/or CO2 from the air after the air has passed through the first layer of material 205 or other upstream portion of the adsorbent material bed 221. The material of the second layer of material 207 can be configured to preferentially remove CO2 and remaining water from the air to help ensure that such impurities are removed from the air so that air output from the adsorber has no water and no CO2 or has a very low level of water and CO2 that is below a pre-selected CO2 threshold level and a pre-selected water threshold level. Such a level can correspond to keeping the N2O within the air at or below a first pre-selected threshold. In some embodiments, the N2O removed from the air fed to the PPU 107 can be a reduction of between 50%-100%, 55%-100%, 55%-99%, or between 50%-95% of the N2O within the feed air (e.g. the air output from the PPU is has at least 50% less N2O as compared to the N2O that was within the air fed to the PPU when the pre-PPU chiller 104 operates in its normal condition (e.g. in a non-tripped condition)). For instance, there can be less than 50% of the N2O within the air fed to the PPU that remains in the air output from the PPU when the pre-PPU chiller 104 operates in its normal condition, less than 5% of the N2O within the air fed to the PPU that remains in the air output from the PPU when the pre-PPU chiller 104 operates in its normal condition, or less than 1% of the N2O within the air fed to the PPU that remains in the air output from the PPU when the pre-PPU chiller 104 operates in its normal condition The adsorbent material bed 221 can be sized and configured so that the N2O removal from the PPU 107 can be less than 50% of the N2O that was within the air fed to the PPU or can be between 10%-50% or 20%-50% of the N2O that was within the air fed to the PPU when the pre-PPU chiller 104 is in a tripped condition and operates in a tripped condition. The ASU system 1 can be operated while the pre-PPU chiller 104 is tripped while the N2O level within the air output from the PPU is above its first pre-selected threshold so long as the N2O content stays below a second pre-selected threshold associated with CO2 breakthrough into the ASU system 1 (e.g. the second pre-selected threshold can be a value that is set such that 50% of the N2O within the air fed to the PPU remaining in the air output from the PPU or more than 50% of the N2O within the air fed to the PPU remaining in the air output from the PPU exceeds this second threshold, which can correspond to an undesired CO2 breakthrough condition).

For example, in situations where the N2O content is 0.4 ppm in the air fed to the PPU, the N2O content in the purified air output from the PPU can be in a range of 0.25 ppm to 0.2 ppm N2O, in a range that is 0.25 ppm to 0.32 ppm N2O, a range of 0.3-0.25 ppm N2O, or in a range of 0.2 ppm to 0.32 ppm N2O when the chiller operates in a tripped condition. In such embodiments, the content of the N2O within the air output from the PPU when the chiller is operating normally can be in the range of 0 ppm to 0.015 ppm, 0 ppm to 0.2 ppm, less than 0.015 ppm, or in a range of 0.03 ppm to 0.015 ppm.

As another example, in situations where the N2O content is 0.3 ppm in the air fed to the PPU, the N2O content in the purified air output from the PPU may be in a range of 0.15 ppm to 0.2 ppm N2O, in a range of 0.15 ppm to 0.24 ppm N2O, in a range that is 0.15 to 0.3 ppm N2O, or in a range of 0.27-0.15 ppm N2O when the chiller operates in a tripped condition. In such embodiments, the content of the N2O within the air output from the PPU when the chiller is operating normally can be in the range of 0 ppm to 0.015 ppm, 0 ppm to 0.15 ppm, less than 0.015 ppm, or in a range of 0.03 ppm to 0.015 ppm.

In some embodiments, the first layer of material 205 can include alumina or can only include alumina while the second layer of material 207 can include 13X, NaX (e.g. NaMSX and/or NaLSX), NaMSX or only include NaLSX. In other embodiments, the first layer of material can include alumina as well as other material and the second layer of material 207 can include NaMSX as well as other material. In yet other embodiments, the first layer of material can include silica and the second layer of material can include NaMSX or other material (e.g. NaX, NaLSX, 13X, etc.). In yet other materials, there can be just a single layer 231 of adsorbent material. This single layer 231 of material can include NaMSX alone or in combination with one or more other materials (e.g. alumina, silica gel, NaLSX, NaX, CaX, 13X, etc.).

The adsorbent material bed 221 can have a size within the chamber of the vessel 203. The size can include the first size S1 of the first layer of adsorbent material 205 and the second size S2 of the second layer of adsorbent material in some embodiments utilizing multiple layers. The size of the bed 221 can be configured so that the first size S1 of the first layer of adsorbent material is between 20% and 90% of the overall size of the bed 221, or between 30% and 75% of the overall size of the bed 221, or between 30%-65% of the overall size of the bed 221 while the second size S2 of the second layer of adsorbent material 207 can be the remaining portion of the size of the bed (e.g. be between 80% and 10%, or between 70% and 25%, or between 70% and 35% of the overall size of the bed 221). In some embodiments, the first layer of material can have a first size S1 that is 30%, 35%, 40%, 45%, 50%, 55%, 60%, 66%, 67%, 70%, or 75% of the overall size of the adsorbent material bed 221 while the second size S2 of the second layer of adsorbent material 207 can be 70%, 65%, 60%, 55%, 50%, 45%, 40%, 34%, 33%, 30%, or 25% of the overall size of the bed 221. The layers of material can include material having a particle size in the 1.0 mm to 5 mm range. The bed and layers of the bed 221 can have a width, length, or diameter that is the same. The thickness, length, or height of the bed may differ and may contribute to the overall size of the bed 221 and the different sizing of the layers of material of the bed 221. In such embodiments, the difference in size between the first and second sizes S1 and S2 can be due to different layer thicknesses, layer depths, layer lengths, or layer heights, within the bed 221 of the vessel 203.

When the adsorber 200 is in the off-stream state and may undergo regeneration, the flow path within the vessel 203 can be reversed. The regeneration gas flow can pass into the vessel 203 via outlet 202, which functions as a regeneration gas flow inlet. The regeneration gas can then pass through the vessel along the reversed flow path and then exits the vessel 203 via the inlet 201, which functions as the regeneration gas flow outlet.

Referring to FIG. 4, the vessel of the adsorber 200 can include a different internal configuration to define a different flow path 210 within the vessel 203. For instance, the vessel 203 can include first inner conduit 206 and a first outer annular conduit 208 that defines a fluid flow path 210 within the vessel 203. It should be understood that the first inner conduit 206 and the first outer annular conduit 208 can each be structured as conduit-type structures within the vessel cavity that can each define a passageway for the air to guide the air along a flow segment of a flow path 210 within the cavity or chamber of the vessel 203.

For example, the first inner conduit 206 can be a conduit having an internal channel that is in fluid communication with openings adjacent an inner side of a first layer of material 205 for conveying air received from the inlet 201 to that first layer of material 205 of the bed 221 of adsorbent material. A downstream end of the first inner conduit 206 can be closed to help drive fluid received from inlet 201 adjacent a first head of the vessel into the first layer of material 205, which can be positioned within a receptacle that has one or more holes so that the first layer of material 205 is in fluid communication with the first inner conduit 206 and can receive air from the first inner conduit 206.

The receptacle of the first layer of material 205 can be positioned to enclose at least a portion of the first inner conduit 206. There can be one or more openings in the first inner conduit 206 in communication with the inner side of the first layer of material 205 so the air can pass out of the first inner conduit 206 and into the first layer of material 205. The one or more holes of the receptacle retaining the first layer of material 205 at its outer side and the one or more holes at its inner side can be perforations, tortious passageways defined in mesh of a screen of the receptacle, or can be other types of holes.

A first outer annular conduit 208 can have at least one inlet opening adjacent an outer side of the second layer of material 207 to receive air from that layer via one or more holes in the receptacle of the vessel 203 that retains the second layer of material 207. The one or more holes of the receptacle retaining the second layer of material 207 at its outer side and the one or more holes at its inner side can be perforations, tortious passageways defined in mesh of a screen, or other types of holes.

The first outer annular conduit 208 can also define a passageway to guide or transport the air output from the outer side of the second layer of material 207 retained within a second receptacle of the vessel 203 to the outlet 202. The second receptacle can have at least one hole at its outer side and at least one hole at its inner side to provide a fluidly communicative connection between the inner conduit 206 and the first outer annular conduit 208. The one or more holes of the second receptacle at its outer side and one or more holes at its inner side can be perforations, tortious passageways defined in mesh of a screen, or other types of holes.

The first and second receptacles that retain the first and second layers of material 205 and 207 can each be defined by or include one or more screens, mesh, at least one plate having multiple holes, at least one perforated membrane of material, or other type of receptacle structure that can retain a layer of material in a desired location within the vessel 301 while also allowing fluid to pass into and out of the layer. In some embodiments (e.g. some vertical and horizontal adsorber embodiments), there may not be a screen or other type of defined receptacle for separation of the layers.

It should be appreciated that when the vessel 203 is in its on-stream state, the first layer of material 205 can be considered an upstream layer of material UL and the second layer of material 207 can be considered a downstream layer of material DL.

There can be a flow path 210 of the vessel 203 that is configured for passing fluid between inner and outer regions of the chamber of the vessel 203 for passing through the layers of material of the bed 221 of the adsorbent material. It should be appreciated that the flow path 210 of the vessel 203 in the on-stream state can include:
  (i) the fluid passing from the inlet 201 into the vessel 203 along a first flow segment of flow path 210,
  (ii) then through the first inner conduit 206 defining an initial feed path for the air along a second flow segment of flow path 210,
  (iii) then through a first layer of material 205 along a third flow segment of flow path 210,
  (iv) then through the second layer of material 207 along a fourth flow segment of the flow path 210;
  (v) then into the first outer annular conduit 208 for being transported to the outlet 202 along a fifth flow segment of flow path 210;
  (vi) and then passed through the outlet 202 for being output from the vessel 203 along a sixth flow segment of the flow path 210.

It should be appreciated that each layer of material within the bed 221 of adsorbent material can be retained in a receptacle having one or more holes for permitting fluid to be passed into and out of the receptacle. The one or more holes can be defined by one or more screen elements of the receptacles in some embodiments. Each of the receptacles that retain a layer of material can include one or more screens, mesh, at least one plate having multiple holes, or at least one perforated membrane of material having a particular pre-selected geometry for defining at least a portion of the receptacle. Each receptacle can also be another type of receptacle structure that can retain a layer of material in a desired location within the vessel 203 while also allowing the air to pass into and out of the layer to fluidly connect the first inner conduit 206 with the first outer annular conduit 208 for passage of the air along the flow path 210. In yet other embodiments, the bed of material can be configured as a single layer of material 231.

The material of the first and second layers 205 and 207 can be different types of particulate material (e.g. zeolite material, catalyst material, adsorbent material, etc.). The particulate size ranges of the material can be in the 1.0-5 mm size range for some embodiments. In some embodiments, the first layer of material 205 can include alumina or can only include alumina while the second layer of material 207 can include NaMSX or only include NaMSX. For instance, the first layer of material 205 can include alumina and/or silica or other material for adsorption of at least water and $CO_2$. The first layer of material can include material that is designed to primarily adsorb the water and $CO_2$ to preferentially remove these impurities from the air so all, or almost all of the $CO_2$ and water is removed from the air within this first layer of material 205 of the adsorbent material bed 221.

The material of the second layer of material 207 can be a molecular sieve adsorbent material. This material of the second layer of material can include 13X, NaX, NaMSX, NaLSX, and/or other molecular sieve material. The material of the second layer of material can be configured to adsorb heavy hydrocarbons (e.g. butane, ethylene, acetylene, propylene, etc.), $N_2O$, CO, as well as any remaining water and/or $CO_2$ from the air after the air has passed through the first layer of material 205. The material of the second layer of material 207 can be configured to preferentially remove $CO_2$ and any remaining water from the air to help ensure that such impurities are removed from the air so that air output from the adsorber has no water and no $CO_2$ or has a very low level of water and $CO_2$ that is below a pre-selected $CO_2$ threshold level and a pre-selected water threshold level.

In some embodiments, the first layer of material 205 can include alumina or can only include alumina while the second layer of material 207 can include NaLSX or only include NaLSX. In other embodiments, the first layer of material can include alumina as well as other material and the second layer of material 207 can include NaLSX as well as other material. In yet other embodiments, the first layer of material can include silica and the second layer of material can include NaMSX or other material (e.g. NaLSX, NaX, 13X, CaX, etc.).

The adsorbent material bed 221 can have a size within the chamber of the vessel 203. The size can include the first size S1 of the first layer of adsorbent material 205 and the second size S2 of the second layer of adsorbent material (e.g. the overall size of the bed 221 can be a sum of the first size S1 and the second size S2 or can include a sum of the first and second sizes S1 and S2 in addition to sizing for one or more third layers).

The size of the bed 221 can be configured so that the first size S1 of the first layer of adsorbent material is between 20% and 90% of the overall size of the bed 221 or between 30% and 75% of the overall size of the bed 221 while the second size S2 of the second layer of adsorbent material 207 can be the remaining portion of the size of the bed (e.g. be between 10% and 80% of the overall size of the bed 221 or be between 70% and 25% of the overall size of the bed 221). In some embodiments, the first layer of material can have a first size S1 that is 30%, 35%, 40%, 45%, 50%, 55%, 60%, 66%, 67%, 70%, or 75% of the overall size of the bed 221 while the second size S2 of the second layer of adsorbent material 207 can be 70%, 65%, 60%, 55%, 50%, 45%, 40%, 34%, 33%, 30%, or 25% of the overall size of the bed 221. The bed and layers of the bed 221 can have a width or diameter that is the same. The thickness, length, or height of the bed may differ and may contribute to the overall size of the bed 221 and the different sizing of the layers of material of the bed 221. In such embodiments, the difference in size between the first and second sizes S1 and S2 can be due to different layer thicknesses, layer lengths, layer depths, or layer heights, within the bed 221 of the vessel 203.

When the adsorber 200 is in the off-stream state and may undergo regeneration, the flow path within the vessel 203 can be reversed. The regeneration gas flow can pass into the vessel 203 via outlet 202, which functions as a regeneration gas flow inlet. The regeneration gas can then pass through the vessel along the reversed flow path and then exits the vessel 203 via the inlet 201, which functions as the regeneration gas flow outlet.

The material of the second layer of material 207 or the adsorbent material bed 221 of the adsorber 200 can be configured to adsorb heavy hydrocarbons (e.g. butane, ethylene, acetylene, propylene, etc.), N2O, CO, as well as any remaining water and/or CO2 from the air after the air has passed through the first layer of material 205 or other upstream portion of the adsorbent material bed 221. The material of the second layer of material 207 can be configured to preferentially remove CO2 and remaining water from the air to help ensure that such impurities are removed from the air so that air output from the adsorber has no water and no CO2 or has a very low level of water and CO2 that is below a pre-selected CO2 threshold level and a pre-selected water threshold level. Such a level can correspond to keeping the N2O within the air at or below a first pre-selected threshold. In some embodiments, the N2O removed from the air by the PPU 107 can be between 20%-100% 25%-100%, 25%-99%, or between 20%-95% of the N2O that was within the air fed to the PPU when the pre-PPU chiller 104 operates in its normal condition (e.g. in a non-tripped condition). For instance, there can be less than 25% of the N2O within the air fed to the PPU that remains in the air output from the PPU when the pre-PPU chiller 104 operates in its normal condition, less than 5% of the N2O within the air fed to the PPU that remains in the air output from the PPU when the pre-PPU chiller 104 operates in its normal condition, or less than 1% of the N2O within the air fed to the PPU that remains in the air output from the PPU when the pre-PPU chiller 104 operates in its normal condition.

In contrast, the adsorbent material bed 221 can be sized and configured so that the N2O removed from the air output from the PPU 107 can be less than 50% of the N2O that was within the air fed to the PPU or can be between 10%-50% or 20%-50% of the N2O that was within the air fed to the PPU when the pre-PPU chiller 104 is in a tripped condition and operates in a tripped condition. The ASU system 1 can be operated while the pre-PPU chiller 104 is tripped while the N2O level within the air output from the PPU is above its first pre-selected threshold so long as the N2O content stays below a second pre-selected threshold associated with CO2 breakthrough into the ASU system 1 (e.g. the second pre-selected threshold corresponds to 50% of the N2O within the air fed to the PPU remaining in the air output from the PPU or more than 50% of the N2O within the air fed to the PPU remaining in the air output from the PPU exceeds this second threshold, which can correspond to an undesired CO2 breakthrough condition).

For example, in situations where the N2O content is 0.4 ppm in the air fed to the PPU, the N2O content in the purified air output from the PPU can be in a range of 0.25 ppm to 0.2 ppm N2O, in a range that is 0.25 ppm to 0.32 ppm N2O, a range of 0.3-0.25 ppm N2O, or in a range of 0.2 ppm to 0.32 ppm N2O when the chiller operates in a tripped condition. In such embodiments, the content of the N2O within the air output from the PPU when the chiller is operating normally can be in the range of 0 ppm to 0.015 ppm, 0 ppm to 0.2 ppm, less than 0.015 ppm, or in a range of 0.03 ppm to 0.015 ppm.

As another example, in situations where the N2O content is 0.3 ppm in the air fed to the PPU, the N2O content in the purified air output from the PPU may be in a range of 0.15 ppm to 0.0675 ppm N2O range, in a range that is 0.15 to 0.24 ppm N2O, in a range that is 0.15 to 0.3 ppm N2O, or in a range of 0.27-0.15 ppm N2O when the chiller operates in a tripped condition. In such embodiments, the content of the N2O within the air output from the PPU when the chiller is operating normally can be in the range of 0 ppm to 0.015 ppm, 0 ppm to 0.15 ppm, less than 0.015 ppm, or in a range of 0.03 ppm to 0.015 ppm.

Referring to FIG. 5, the vessel of the adsorber 200 can include a different internal configuration to define a different flow path 210 within the vessel 203. For instance, the vessel 203 can include a bed 221 of adsorbent material that includes a first layer of material 205 and a second layer of material 207. A first receptacle retaining the first layer of material 205 and a second receptacle retaining the second layer of material 207 can be positioned within the chamber of the vessel 203. Each of the receptacles can include one or more holes at their downstream and upstream sides so the receptacles are in fluid communication with each other and the inlet 201 and the outlet 202 of the vessel are in fluid communication. The one or more holes at each side of each receptacle retaining a respective layer of material can be one or more perforations, tortious passageways defined in mesh of a screen, or one or more other types of holes. The layers of material can be arranged so that air passes along a flow path 210 so that the air passes into the vessel 203 via the inlet 201 and then passes through the first layer of material 205 and then the second layer of material 207 before the air is passed out of the vessel 203 via the outlet 202 while the adsorber 200 is in the on-stream state.

The material of the first and second layers 205 and 207 can be different types of particulate material (e.g. zeolite material, catalyst material, adsorbent material, etc.). The size range for the particulate material can be between 1.0 mm-5.0 mm in some embodiments. The first layer of material 205 can include alumina and/or silica or other material for adsorption of at least water and CO2. The first layer of material can include material that is designed to primarily adsorb the water and CO2 to preferentially remove these impurities from the air so all, or almost all of the CO2 and water is removed from the air within this first layer of material 205 of the adsorbent material bed 221.

The material of the second layer of material 207 can be a molecular sieve adsorbent material. This material of the second layer of material can include 13X, NaX, NaMSX, NaLSX, and/or other molecular sieve material. The material of the second layer of material 207 can be configured to adsorb heavy hydrocarbons (e.g. ethylene, butane, acetylene, propylene, etc.), N2O, CO, as well as any remaining water and/or CO2 from the air after the air has passed through the first layer of material 205. The material of the second layer of material 207 can be configured to preferentially remove CO2 and water from the air to help ensure that such impurities are removed from the air so that air output from the adsorber has no water and no CO2 or has a very low level of water and CO2 that is below a pre-selected CO2 threshold level and a pre-selected water threshold level.

In some embodiments, the first layer of material 205 can include alumina or can only include alumina while the second layer of material 207 can include NaLSX or only include NaLSX. In other embodiments, the first layer of material can include alumina as well as other material and the second layer of material 207 can include NaLSX as well as other material. In yet other embodiments, the first layer of material can include silica and the second layer of material can include NaX, NaMSX, 13X, or other material.

The adsorbent material bed 221 can have a size within the chamber of the vessel 203. The size can include the first size S1 of the first layer of adsorbent material 205 and the second size S2 of the second layer of adsorbent material (e.g. the overall size of the bed 221 can be a sum of the first size S1 and the second size S2 or can include a sum of the first and second sizes S1 and S2 in addition to sizing for one or more third layers).

The size of the bed 221 can be configured so that the first size S1 of the first layer of adsorbent material is between 20% and 90% of the overall size of the bed 221 or between 50% and 75% of the overall size of the bed 221 or between 30% and 65% of the overall size of the bed 221 while the second size S2 of the second layer of adsorbent material 207 can be the remaining portion of the size of the bed (e.g. be between 10% and 80% of the overall size of the bed 221, be between 50% and 25% of the overall size of the bed 221, or be between 35% and 70% of the overall size of the bed 221). In some embodiments, the first layer of material can have a first size S1 that is 30%, 35%, 40%, 45%, 50%, 55%, 60%, 66%, 67%, 70%, or 75% of the overall size of the adsorbent material bed 221 while the second size S2 of the second layer of adsorbent material 207 can be 70%, 65%, 60%, 55%, 50%, 45%, 40%, 34%, 33%, 30%, or 25% of the overall size of the bed 221. The bed and layers of the bed 221 can have a width or diameter that is the same. The thickness or height of the bed may differ and may contribute to the overall size of the bed 221 and the different sizing of the layers of material of the bed 221. In such embodiments, the difference in size between the first and second sizes S1 and S2 can be due to different layer thicknesses, layer depths, or layer heights, within the bed 221 of the vessel 203.

When the adsorber 200 is in the off-stream state and may undergo regeneration, the flow path within the vessel 203 can be reversed. The regeneration gas flow can pass into the vessel 203 via outlet 202, which functions as a regeneration gas flow inlet. The regeneration gas can then pass through the vessel along the reversed flow path by passing through the second layer of material 207 and then the first layer of material 205 before the regeneration gas flow exits the vessel 203 via the inlet 201, which functions as the regeneration gas flow outlet.

It should be appreciated that the material of the second layer of material 207 or the adsorbent material bed 221 of the adsorber 200 can be configured to adsorb heavy hydrocarbons (e.g. ethylene, butane, acetylene, propylene, etc.), N2O, CO, as well as any remaining water and/or CO2 from the air after the air has passed through the first layer of material 205 or other upstream portion of the adsorbent material bed 221. The material of the second layer of material 207 can be configured to preferentially remove CO2 and remaining water from the air to help ensure that such impurities are removed from the air so that air output from the adsorber has no water and no CO2 or has a very low level of water and CO2 that is below a pre-selected CO2 threshold level and a pre-selected water threshold level. Such a level can correspond to keeping the N2O within the air at or below a first pre-selected threshold. In some embodiments, the N2O in air output from the PPU 107 can be a reduced in a range of between 20%-100% 25%-100%, 25%-99%, or between 20%-95% as compared to the N2O that was within the air fed to the PPU when the pre-PPU chiller 104 operates in its normal condition (e.g. in a non-tripped condition). For instance, there can be less than 25% of the N2O within the air fed to the PPU that remains in the air output from the PPU when the pre-PPU chiller 104 operates in its normal condition, less than 5% of the N2O within the air fed to the PPU that remains in the air output from the PPU when the pre-PPU chiller 104 operates in its normal condition, or less than 1% of the N2O within the air fed to the PPU that remains in the air output from the PPU when the pre-PPU chiller 104 operates in its normal condition In contrast, the adsorbent material bed 221 can be sized and configured so that the N2O removed from the air output from the PPU 107 can be less than 50% of the N2O that was within the air fed to the PPU, can be between 20%-50% of the N2O that was within the air fed to the PPU or can be between 10%-50% of the N2O that was within the air fed to the PPU when the pre-PPU chiller 104 is in a tripped condition and operates in a tripped condition. The ASU system 1 can be operated while the pre-PPU chiller 104 is tripped while the N2O level within the air output from the PPU is above its first pre-selected threshold so long as the N2O content stays below a second pre-selected threshold associated with CO2 breakthrough into the ASU system 1 (e.g. 50% of the N2O within the air fed to the PPU remains in the air output from the PPU or more than 50% of the N2O within the air fed to the PPU remains in the air output from the PPU, which can correspond to an undesired CO2 breakthrough condition).

For example, in situations where the N2O content is 0.4 ppm in the air fed to the PPU, the N2O content in the purified air output from the PPU can be in a range of 0.25 ppm to 0.2 ppm N2O, in a range that is 0.25 ppm to 0.32 ppm N2O, a range of 0.3-0.25 ppm N2O, or in a range of 0.2 ppm to 0.32 ppm N2O when the chiller operates in a tripped condition. In such embodiments, the content of the N2O within the air output from the PPU when the chiller is operating normally can be in the range of 0 ppm to 0.015 ppm, 0 ppm to 0.2 ppm, less than 0.015 ppm, or in a range of 0.03 ppm to 0.015 ppm.

As another example, in situations where the N2O content is 0.3 ppm in the air fed to the PPU, the N2O content in the purified air output from the PPU may be in a range of 0.15 ppm to 0.0675 ppm N2O range, in a range that is 0.15 to 0.24 ppm N2O, in a range that is 0.15 to 0.3 ppm N2O, or in a range of 0.27-0.15 ppm N2O when the chiller operates in a tripped condition. In such embodiments, the content of the N2O within the air output from the PPU when the chiller is operating normally can be in the range of 0 ppm to 0.015 ppm, 0 ppm to 0.15 ppm, less than 0.015 ppm, or in a range of 0.03 ppm to 0.015 ppm.

In the embodiments of the adsorber 200, including the embodiments discussed herein and shown in the drawings, the first material of the first layer of material 205 can be silica gel and/or alumina particulate material configured to remove moisture from the fluid (e.g. via composition and pore structure of the particulate material to facilitate removal of water from the fluid via adsorption) and the second material of the second layer of material 207 can be a molecular sieve material. For example, the material of the second layer of material 207 can be a high capacity adsorbent material such as NaLSX zeolite material so that the second layer of material 207 can be the same size as the first layer of material 205 or can be smaller than the first layer of material 205.

We have determined that having the first layer of material 205 as the larger layer can permit 100% of water be removed via the first layer of material 205 and having the second layer of material 207 sized enough to remove 100% of CO2 while allowing some N2O to breakthrough beyond a typically permissible threshold level for a pre-selected N2O breakthrough time period in situations where the pre-PPU chiller 104 is not operating to effectively cool the air to a desired temperature range (e.g. due to a malfunction or processing problem). Permitting the N2O to breakthrough during operations while pre-PPU chiller 104 is undergo maintenance or otherwise in a tripped condition can permit the ASU system 1 to operate so that smaller sized adsorbers 200 of lower cost can be utilized in the PPU 107, which can reduce operational and capital costs for operations.

For example, the adsorbent material bed 221 of the adsorbers 200 of the PPU 107 can be configured to adsorb N2O as well as any remaining water and/or CO2 from the air after the air has passed through the first layer of material 205 or an upstream portion of the adsorbent material bed 221. The adsorbent material bed 221 can be sized and configured to include material that preferentially removes CO2 and water from the air to help ensure that such impurities are removed from the air so that air output from the PPU 107 has no water and no CO2 or has a very low level of water and CO2 that is below a pre-selected CO2 threshold level and a pre-selected water threshold level. Such a level can correspond to keeping the N2O within the air at or below a first pre-selected threshold. In some embodiments, the N2O removed from the air output from the PPU 107 can be between 20%-100% 25%-100%, 25%-99%, or between 20%-95% of the N2O that was within the air fed to the PPU when the pre-PPU chiller 104 operates in its normal condition (e.g. in a non-tripped condition). For instance, there can be less than 25% of the N2O within the air fed to the PPU that remains in the air output from the PPU when the pre-PPU chiller 104 operates in its normal condition, less than 5% of the N2O within the air fed to the PPU that remains in the air output from the PPU when the pre-PPU chiller 104 operates in its normal condition, or less than 1% of the N2O within the air fed to the PPU that remains in the air output from the PPU when the pre-PPU chiller 104 operates in its normal condition In contrast, the adsorbent material bed 221 can be sized and configured so that the N2O removed from the air output from the PPU 107 can be less than 50% of the N2O that was within the air fed to the PPU, can be between 20%-50% of the N2O that was within the air fed to the PPU, or can be between 10%-50% of the N2O that was within the air fed to the PPU when the pre-PPU chiller 104 is in a tripped condition and operates in a tripped condition. The ASU system 1 can be operated while the pre-PPU chiller 104 is tripped while the N2O level within the air output from the PPU is above its first pre-selected threshold so long as the N2O content stays below a second pre-selected threshold associated with CO2 breakthrough into the ASU system 1 (e.g. 50% or more than 50% of the N2O within the air fed to the PPU remains in the air output from the PPU, which can correspond to an undesired CO2 breakthrough condition).

We have determined that permitting N2O to pass through the PPU 107 at elevated levels for a pre-selected duration of time can be safely permitted. For example, we determined that permitting N2O at elevated levels passing beyond the PPU 107 does not pose an immediate safety concern or other immediate operational concern. In contrast, CO2 breakthrough would pose such an issue. By permitting the ASU system to operate at full capacity during maintenance of pre-PPU chiller 104 or other trip of the pre-PPU chiller 104, the ASU can continue to function at greater overall profit and efficiency than if the ASU was shut down or operated at a lower capacity to account for the pre-PPU chiller's operational status.

Because N2O elevated levels do not pose an immediate issue, we determined that the operational tradeoffs permit N2O to break through the PPU 107 while CO2 remains tightly controlled. Further, the elevated N2O condition can be further mitigated at other operational times of the ASU system 1 that is more advantageous to an operator of the plant without significantly offsetting the operational efficiency and cost savings provided by permitting limited N2O breakthrough operations of the system. For instance, the ASU system 1 can undergo a corrective action when the system is not operating with the elevated N2O levels to help mitigate N2O accumulation that can detrimentally affect an operational unit of the plant. For example, the defrost interval for the ASU system 1 can be adjusted to account for the duration of the elevated N2O operational impact on the system 1. Such a defrost time interval typically has occurs every 5-8 years, 3-10 years, 4-10 years, or 3-8 years. The slight adjustment of this interval (e.g. 0.5-4 months, 0.5-1 month, shorten the duration by up to a few months, etc.) can have a negligible impact on cost and efficiency improvements provided by operations of the ASU system 1 at elevated N2O levels that account for periodic operational issues of the pre-PPU chiller 104.

The first layer of material 205 in the embodiments of the adsorber 200 can also include particulates that have a different average particle size than the average particle size of the second layer of material 207. In other embodiments, it is contemplated that the first and second layers of material can have the same average particle size or similar average particle sizes.

Embodiments of the ASU system 1 can utilize a controller to monitor and control operations of the system. For instance, embodiments of the ASU system shown in FIGS. 1-5 as well as other embodiments explicitly discussed herein can include a controller such as the exemplary controller shown in FIG. 6. Temperature sensors, pressure sensors, flow sensors, and concentration sensors configured to detect a concentration of one or more compounds (e.g. o2, Ar, CO2, N2, Xe, Kr, CO, water, etc.) can be included for sensing and/or detecting flow rates, concentrations, temperatures or pressures of fluid flowing through different elements or units of the plant and/or conduits between those units. For example, there can be sensors positioned to detect (i) the air flow rate, pressure, temperature and feed concentrations for the air fed to the compressor system 103, (ii) flow rate, pressure, temperature and/or feed concentrations of the air output from the compressor system 103 for feeding to a PPU 107 (iii) flow rate, pressure, temperature and feed concentrations of the air output from the PPU 107 for feeding to the heat exchanger 109, and/or (iv) the flow rate, pressure, temperature and constituent concentrations of the fluid fed to and/or output from the multiple column assembly 111. There can also be other sensors positioned in the ASU system 1 to monitor and control the operations of these elements of the system. A controller can be provided to receive data from these sensor and adjust operations of different elements based on the received sensor data. An example of such a controller can be seen in FIG. 6, and can include a processor connected to a non-transitory computer readable medium and at least one interface for communications with the sensors. The processor can run at least one automated control program stored in the computer readable medium (e.g. non-transitory memory, flash memory, etc.) that defines a method for controlling the operation of the ASU system 1 and/or one or more elements of the system.

It should be appreciated that embodiments of the controller can also be configured to utilize other sensor data to actuate different plant operations and use of different conduits for different flow paths of fluid to and from different elements. In some embodiments, the controller can be connected to a display, and at least one input device and/or input/output device to facilitate output of data to a user or operator and receipt of input from an operator. For instance, the controller can be connectable to an operator work station or a computer of an operator of the plant. The controller can also be connected to other plant control elements for incorporation into a larger automated process control system for the plant.

An exemplary method of purifying air via a PPU 107 of an ASU system 1 having a pre-PPU chiller 104 that is upstream of the PPU 107 to cool compressed air before the compressed air output from the compressor system 103 is fed to the PPU 107 can be appreciated from FIG. 7. For instance, the method can include passing air through at least one adsorber 200 of the PPU 107 to pass the air through a bed 221 of adsorbent material within a vessel 203 of the adsorber 200. In response to the pre-PPU chiller 104 being determined to have an issue resulting in the pre-PPU chiller 104 being tripped or requiring the pre-PPU chiller 104 to be taken off-line, the ASU system can continue to operate at a full capacity even though N2O within the air output from the PPU 107 exceeds a first pre-selected threshold while that air output from the PPU 107 has N2O that is below a second pre-selected threshold associated with a CO2 breakout condition. The ASU system 1 can be configured so that operation of the ASU system 1 at full capacity even though N2O within the air output from the PPU 107 exceeds the first pre-selected threshold is performable without a redundant chiller being operated to cool the compressed air from the compressor system 103 before the compressed air is fed to the PPU 107 to replace the pre-PPU chiller 104 determined to have the issue resulting in the pre-PPU chiller 104 being tripped or requiring the pre-PPU chiller 104 to be taken off-line.

The method can also include taking a remedial action to address excess N2O within the air being output from the PPU 107 after the pre-PPU chiller 104 is back on-line for the ASU system 1 and the air output from the PPU 107 no longer has N2O that exceeds the first pre-selected threshold. This remedial action does not have to be taken immediately after the pre-PPU chiller 104 is brought back on line and operates in a normal condition (e.g. non-tripped condition). For instance, the remedial action that is taken can be scheduled after the pre-PPU chiller 104 is brought back on line at a time that is more convenient to an operator of the ASU system. The remedial action that is subsequently taken can be taken to account for the time at which the pre-PPU chiller 104 failed to sufficiently operate to cool the compressed air to a more desired temperature, which may have reduced the ability of the adsorber material of the adsorber's bed 221 of adsorbent material to remove the N2O from the air passed through the adsorber 200 while the ASU operated while he pre-PPU chiller 104 was in a tripped condition. A remedial action that can be taken is to shorten the cycle time for thermal swing adsorption (TSA). Another remedial action that can be taken can include adjusting a defrost interval for the ASU system to account for a duration of time at which the ASU system 1 operated with the air output from the PPU 107 having N2O that exceeded the first pre-selected threshold. The adjusting of the defrost interval can include decreasing an amount of time until a defrosting of the ASU system 1 is scheduled to occur or is to be scheduled to occur. For example, an adjustment of the defrost interval can be provided by operating data for the ASU system showing a higher accumulation rate than a design basis so long as an industry maximum limit for the sized ASU system is not exceeded. Such adjustment in some embodiments could be facilitated via on-line calculations taking into account system parameters etc.) and display on a screen to warn an operator how much time they have left to perform a defrost operation.

As another example, the adjusting of the defrost interval can be indicated by a detection of accumulated N2O and/or CO2 in the ASU system such that the scheduling of the defrosting of the ASU system 1 can be triggered at a shorter time interval as a result of the operations of the ASU system at the elevated N2O levels for relatively short durations during chiller trip situations. Such an adjustment may naturally follow from the operation of the ASU system 1 with the elevated N2O levels during pre-PPU chiller trip operational conditions.

Embodiments of the method can utilize a PPU that has one or more adsorbers 200 as discussed herein. For example, the bed 221 of adsorbent material can include a first layer of adsorbent material 205 and a second layer of adsorbent material 207. The first layer of adsorbent material can include material that is to remove water and/or CO2 from air (e.g. alumina material, etc.). The second layer of adsorbent material 207 can be positioned downstream of the first layer of adsorbent material 205 to contact the air after the air passes through the first layer of adsorbent material 205. The second material of the second layer of adsorbent material can include, for example, NaLSX or NaMSX material. The first layer of adsorbent material 205 can have a first size S1 and the second layer of adsorbent material 207 can have a second size S2. As discussed above, the first size S1 can be equal to or larger than the second size S2.

Embodiments of the method can also include other steps. For example, the method can also include monitoring a content of CO2 within the air output from the PPU 107. This monitoring can be performed to help ensure that CO2 does not break through the PPU 107 in excess of a pre-selected CO2 threshold level. An analyzer can be utilized to perform this monitoring. The analyzer can be a sensor that is connected to the controller of the ASU system to facilitate such monitoring, for example.

Embodiments of the method can also include other steps. For example, the method can also include maintaining an inventory of spare parts to service the pre-PPU chiller on-site to minimize chiller maintenance time. Such stored spare parts can include the parts most commonly expected to mechanically fail so that the most common chiller operational problems can be more quickly addressed. This can help minimize the time at which the ASU system may operate while the chiller is in a tripped condition.

We have determined that embodiments of our ASU system 1, PPU 107, and adsorbers 200 and methods of using the same can provide significant advantages, such as reduction in capital cost, ease of operation and maintenance, overall reduction in power costs by the use of chillers, improved operational flexibility, etc. For example, embodiments of the adsorbers 200 can utilize a smaller molecular sieve layer of adsorbent material for N2O removal, which can significantly reduce the required size of an adsorber 200 for a PPU 107. This can improve operational efficiency as well as reduce the overall capital cost, maintenance cost, and operational cost of a PPU utilizing such adsorbers 200. Embodiments of our PPU 107 using embodiments of our adsorber(s) 200 can also eliminate the need for chiller redundancy for a pre-PPU chiller 104 of the ASU system 1. The avoidance of a backup pre-PPU chiller 104 to go on-line to function in the event the on-line pre-PPU chiller 104 experience a problem or requires maintenance can greatly reduce the capital cost of a system 1 and reduce the required footprint for such a system. In some types of facilities, this can provide a capital cost saving of about $250,000 since the additional chiller and installation of the chiller can be avoided.

Embodiments of the PPU 107 and adsorber 200 can also permit an ASU system 1 to be operated without having a special N2O removal layer, which can often require a higher temperature regeneration gas as compared to use of other adsorbent materials that have a lower adsorbent material regeneration temperature. For example, embodiments of the adsorber 200 can avoid use of a layer of CaX adsorbent material, which can require use of a regeneration gas having a temperature of 300° C. or higher. Embodiments can therefore provide a lower operational cost requiring lower temperature regeneration gas flows.

Embodiments of the PPU 107 and adsorbers 200 can permit the ASU system 1 to operate at full capacity during a pre-PPU chiller 104 malfunction or trip of pre-PPU chiller 104 that also avoids requiring use of a redundant pre-PPU chiller 104 having to go on-line to cool the compressed air to be fed to the PPU 107. Such operational flexibility permits a reduction in capital costs, operational costs, and maintenance costs as well as providing improved output for the ASU system 1. The ASU system can also be configured to monitor for excess N2O and C2O accumulation to provide a further enhancement to the safety of the operation of the ASU system and help facilitate an adjustment to the defrost interval is safely implemented due to the shortening of this interval that can be necessitated due to the running of the ASU at the elevated N2O levels. For example, an N2O analyzer and/or a CO2 analyzer can be positioned to monitor accumulation of N2O and CO2 within the multiple column assembly 111 to help ensure the defrost interval for the ASU system 1 is properly adjusted to account for the times at which the ASU system 1 may operate while the pre-PPU chiller 104 is in a tripped condition and the ASU system 1 operates at elevated N2O concentration levels. Overall profitability for an operator of an ASU system can therefore be greatly enhanced by utilization of an embodiment of the ASU system 1 that utilizes the PPU 107 having embodiments of our adsorber 200 while also permitting the ASU system 1 to be operated in a safe manner.

It should be appreciated that modifications to the embodiments explicitly shown and discussed herein can be made to meet a particular set of design objectives or a particular set of design criteria. For instance, the arrangement of valves, piping, and other conduit elements (e.g. conduit connection mechanisms, tubing, seals, etc.) for interconnecting different units of the plant for fluid communication of the flows of fluid between different units can be arranged to meet a particular plant layout design that accounts for available area of the plant, sized equipment of the plant, and other design considerations. As another example, the flow rate, pressure, and temperature of the fluid passed through the radial adsorber as well as passed through other plant elements can vary to account for different plant design configurations and other design criteria. As yet another example, the number of radial adsorbers in the PPU 107 and how they are arranged can be adjusted to meet a particular set of design criteria. As yet another example, the material composition for the different structural components of the adsorbers 200, PPU 107, and ASU system 1 can be any type of suitable materials as may be needed to meet a particular set of design criteria. Embodiments can be utilized in conjunction with any type of adsorber vessel—radial, vertical, horizontal, vertical cross flow, etc. for a PPU 107. The pre-PPU chiller 104 can be any type of chiller—mechanical, absorption-based, etc. Embodiments can be configured for utilization of any number of ASU trains, chillers (parallel or in series), TSA vessels, etc. While a preferred embodiment is a TSA implementation, it could also work for other adsorption cycles where chillers can benefit the process, such as pressure swing, vacuum swing, etc. It would also work if there are other unit operations between the pre-PPU chiller 104 and the PPU 107.

It should be appreciated that embodiments of the ASU system 1 can be configured as an air separation plant or be incorporated into another type of plant in which at least one adsorber 200 can be utilized. The plant. adsorption system, PPU 107, and the adsorber 200 can each be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.).

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the adsorber, adsorption system, PPU, plants having an adsorption system utilizing one or more of the adsorbers, ASU systems, and methods of making and using the same have been shown and described above, it is to be distinctly understood that the invention is not limited thereto but may be otherwise variously embodied and practiced within the scope of the following claims.

What is claimed is:

1. A method of purifying air via a pre-purification unit (PPU) of an air separation unit (ASU) system having a pre-PPU chiller that is upstream of the PPU to cool compressed air before the compressed air is fed to the PPU, the method comprising:

passing the compressed air through an adsorber of the PPU to pass the compressed air through a bed of adsorbent material within a vessel of the adsorber;

in response to the pre-PPU chiller being tripped and/or taken off-line, continuing to operate the ASU system even though nitrous oxide (N2O) within the compressed air output from the PPU exceeds a first pre-selected threshold and is below a second pre-selected threshold associated with carbon dioxide (CO2) breakthrough to prevent a CO2 content within the compressed air output from the PPU being above a pre-selected CO2 threshold level while the N2O exceeds the first pre-selected threshold.

2. The method of claim 1, wherein the bed of adsorbent material comprises alumina, silica gel, 13X, NaX, NaLSX, NaMSX, or combinations thereof having a particulate size range of 1.0 millimeters (mm) to 5 mm.

3. The method of claim 1, comprising:
monitoring a content of carbon dioxide (CO2) within the compressed air output from the PPU.

4. The method of claim 1, comprising:
taking a remedial action to address N2O within the compressed air output from the PPU being greater than first pre-selected threshold having been output from the PPU and fed downstream of the PPU after the pre-PPU chiller is back on-line for the ASU system and the compressed air output from the PPU no longer has N2O that exceeds the first pre-selected threshold.

5. The method of claim 4, wherein the remedial action includes shortening a defrost interval for the ASU system to account for a duration of time at which the ASU system operated with the compressed air output from the PPU having N2O that exceeded the first pre-selected threshold.

6. The method of claim 5, wherein the shortening of the defrost interval includes decreasing an amount of time until a defrosting of the ASU system is scheduled to occur.

7. The method of claim 1, wherein:
the first pre-selected threshold is in a range of 0-0.2 ppm N2O and the second pre-selected threshold is in a range of 0.2-0.32 ppm N2O, or
the first pre-selected threshold is selected such that 20%-100% of the N2O within the compressed air fed to the PPU is removed from the compressed air and the second pre-selected threshold is selected such that less than 50% of the N2O within the compressed air fed to the PPU is removed from the compressed air.

8. The method of claim 1, wherein the continuing to operate the ASU system even though N2O within the compressed air output from the PPU exceeds the first pre-selected threshold and is below the second pre-selected threshold associated with CO2 breakthrough is permitted to occur for a pre-selected duration time period that is no more than 14 days, no more than 7 days, or no more than 2 days.

9. The method of claim 1, wherein the continuing to operate the ASU system even though N2O within the compressed air output from the PPU exceeds the first pre-selected threshold is performed without a redundant pre-PPU chiller being operated to cool the compressed air before the compressed air is fed to the PPU to replace the pre-PPU chiller determined to have the issue resulting in the pre-PPU chiller being tripped or requiring the pre-PPU chiller to be taken off-line.

* * * * *